US012632290B2

(12) United States Patent
Gayen et al.

(10) Patent No.: US 12,632,290 B2
(45) Date of Patent: May 19, 2026

(54) METHOD AND APPARATUS FOR DYNAMICALLY ADJUSTING PIPELINE DEPTH TO IMPROVE EXECUTION LATENCY

(71) Applicant: Intel Corporation, Santa Clara, CA (US)

(72) Inventors: Saurabh Gayen, Portland, OR (US); Dhananjay Joshi, Portland, OR (US); Philip Lantz, Cornelius, OR (US); Rajesh Sankaran, Portland, OR (US); Narayan Ranganathan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 17/559,612

(22) Filed: Dec. 22, 2021

(65) Prior Publication Data

US 2023/0040226 A1 Feb. 9, 2023

Related U.S. Application Data

(60) Provisional application No. 63/226,159, filed on Jul. 27, 2021.

(51) Int. Cl.
*G06F 9/48* (2006.01)
*G06F 9/30* (2018.01)
*G06F 9/455* (2018.01)

(52) U.S. Cl.
CPC ........ *G06F 9/4881* (2013.01); *G06F 9/30079* (2013.01); *G06F 9/45558* (2013.01); *G06F 9/485* (2013.01); *G06F 2009/45591* (2013.01)

(58) Field of Classification Search
CPC .............. G06F 9/4881; G06F 9/30079; G06F 9/45558; G06F 9/485; G06F 2009/45591;
(Continued)

(56) References Cited

U.S. PATENT DOCUMENTS 11,106,613 B2 8/2021 Lantz et al.
2007/0271449 A1* 11/2007 Lichtensteiger ...... G06F 9/3869
712/244
(Continued)

FOREIGN PATENT DOCUMENTS

EP 3547130 A1 10/2019

OTHER PUBLICATIONS

Notification of Oral Proceeding, EP App. No. 22181003.9, Jul. 23, 2024, 8 pages.
(Continued)

*Primary Examiner* — Bradley A Teets
*Assistant Examiner* — Melissa A Headly
(74) *Attorney, Agent, or Firm* — NICHOLSON DE VOS WEBSTER & ELLIOTT LLP

(57) ABSTRACT

Apparatus and method for managing pipeline depth of a data processing device. For example, one embodiment of an accelerator comprises: an interface to receive a plurality of work requests from a plurality of clients; and a plurality of engines to perform the plurality of work requests; wherein the work requests are to be dispatched to the plurality of engines from work queues, the work queues to store a work descriptor per work request, each work descriptor to include information needed to perform a corresponding work request, wherein the work queues include a first and a second work queue to store work descriptors associated with first latency characteristics and second latency characteristics, respectively; engine configuration circuitry to configure a first engine to have a first pipeline depth based on the first latency characteristics and to configure a second engine to have a second pipeline depth based on the second latency characteristics.

24 Claims, 21 Drawing Sheets

(58) Field of Classification Search
CPC . G06F 9/5027; G06F 12/0857; G06F 12/0842
See application file for complete search history.

(56) References Cited

U.S. PATENT DOCUMENTS

| | | | | |
|---|---|---|---|---|
| 2009/0060197 | A1* | 3/2009 | Taylor | H04L 9/0844 |
| | | | | 380/29 |
| 2013/0152099 | A1* | 6/2013 | Bass | G06F 9/5038 |
| | | | | 718/103 |
| 2019/0303324 | A1 | 10/2019 | Lantz et al. | |
| 2020/0004703 | A1 | 1/2020 | Sankaran et al. | |
| 2020/0401440 | A1* | 12/2020 | Sankaran | G06F 9/38585 |
| 2021/0014177 | A1* | 1/2021 | Kasichainula | H04L 47/6295 |

OTHER PUBLICATIONS

Anonymous: "Intel Data Streaming Accelerator Preliminary Architecture Specification", Order No. 341204-001US, Revision: 1.0, Nov. 2019, pp. 41 (Part II) XP055692158.
Anonymous: "Intel Data Streaming Accelerator Preliminary Architecture Specification", Order No. 341204-001US, Revision: 1.0, Nov. 2019, pp. 84 (Part I) XP055692158.
European Search Report and Search Opinion, EP App. No. 22181003.9, Dec. 13, 2022, 9 pages.
Brief Communication, EP App. No. 22181003.9, May 6, 2025, 2 pages.
Office Action, EP App. No. 22181003.9, Dec. 20, 2023, 4 pages.
Intention to Grant, EP App. No. 22181003.9, Jun. 13, 2025, 8 pages.

* cited by examiner

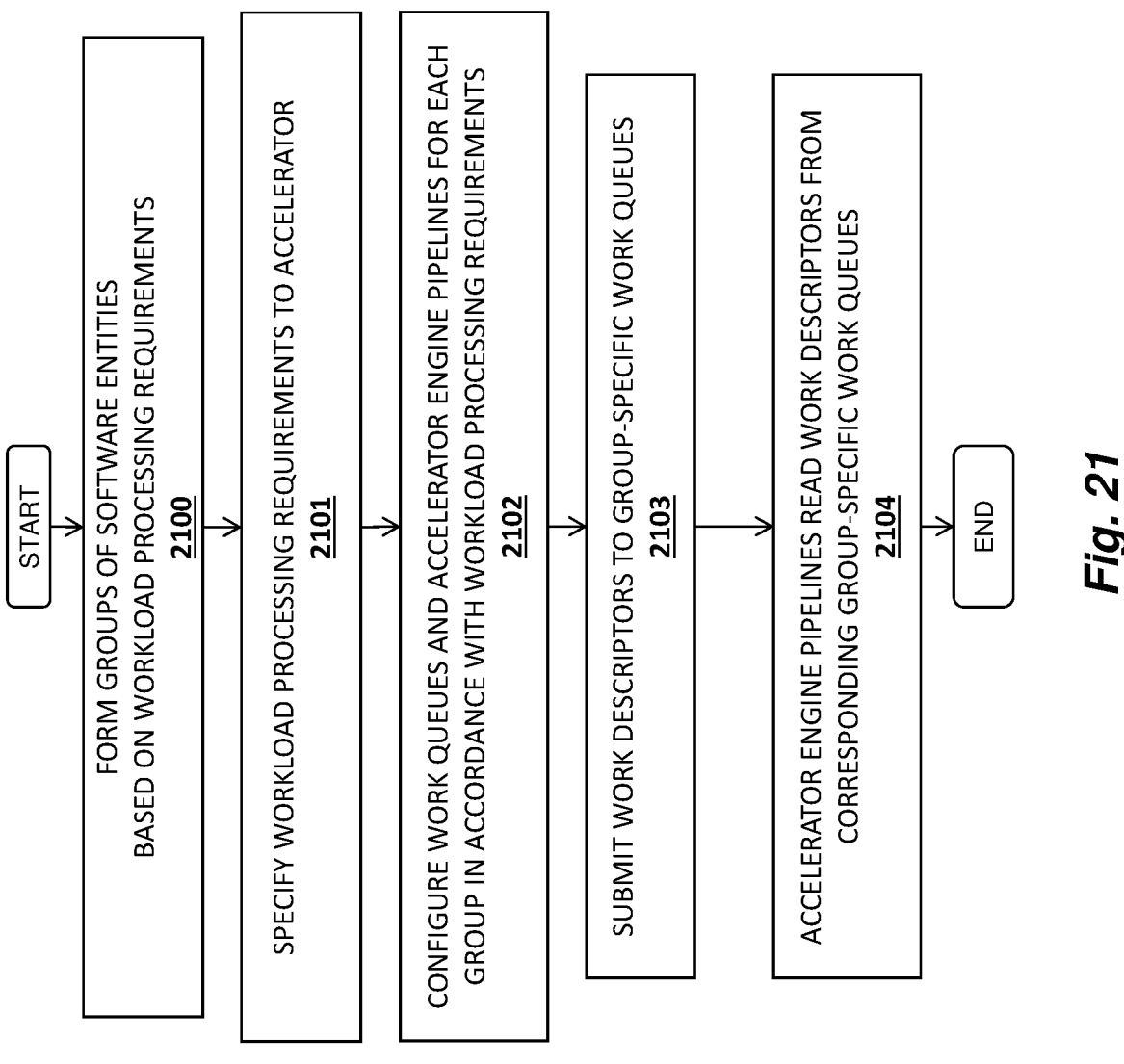

START

FORM GROUPS OF SOFTWARE ENTITIES
BASED ON WORKLOAD PROCESSING REQUIREMENTS
2100

SPECIFY WORKLOAD PROCESSING REQUIREMENTS TO ACCELERATOR
2101

CONFIGURE WORK QUEUES AND ACCELERATOR ENGINE PIPELINES FOR EACH
GROUP IN ACCORDANCE WITH WORKLOAD PROCESSING REQUIREMENTS
2102

SUBMIT WORK DESCRIPTORS TO GROUP-SPECIFIC WORK QUEUES
2103

ACCELERATOR ENGINE PIPELINES READ WORK DESCRIPTORS FROM
CORRESPONDING GROUP-SPECIFIC WORK QUEUES
2104

END

METHOD AND APPARATUS FOR DYNAMICALLY ADJUSTING PIPELINE DEPTH TO IMPROVE EXECUTION LATENCY

CROSS REFERENCE TO RELATED APPLICATION

This application claims the benefit of U.S. Provisional Patent Application No. 63/226,159, filed Jul. 27, 2021, all of which is herein incorporated by reference.

BACKGROUND

Field of the Invention

This invention relates generally to the field of computer processors. More particularly, the invention relates to a method and apparatus for dynamically adjusting pipeline depth to improve execution latency.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale CA implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

BRIEF DESCRIPTION OF THE DRAWINGS

A better understanding of the present invention can be obtained from the following detailed description in conjunction with the following drawings, in which:

2

Figure 1:
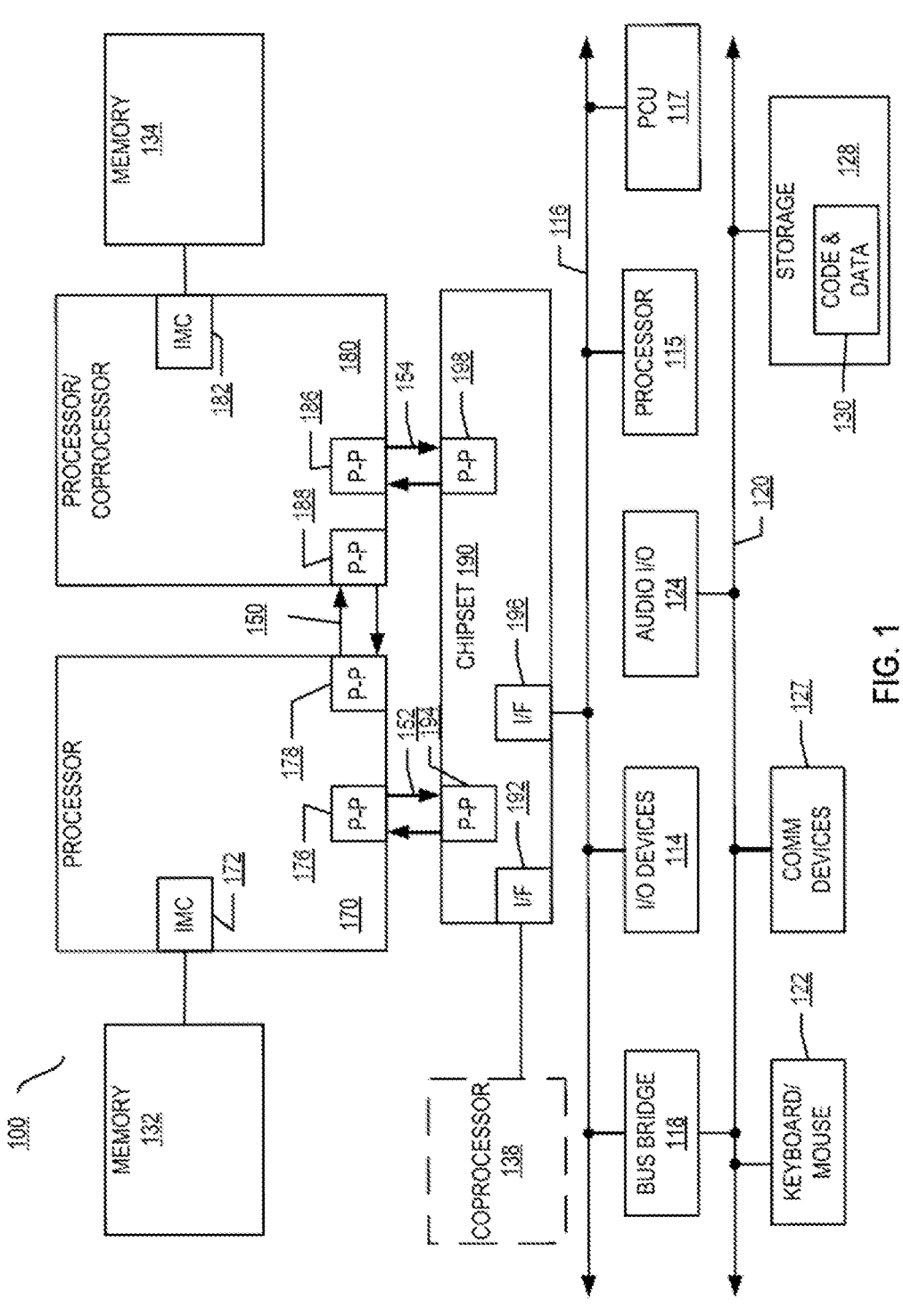
Figure 2:
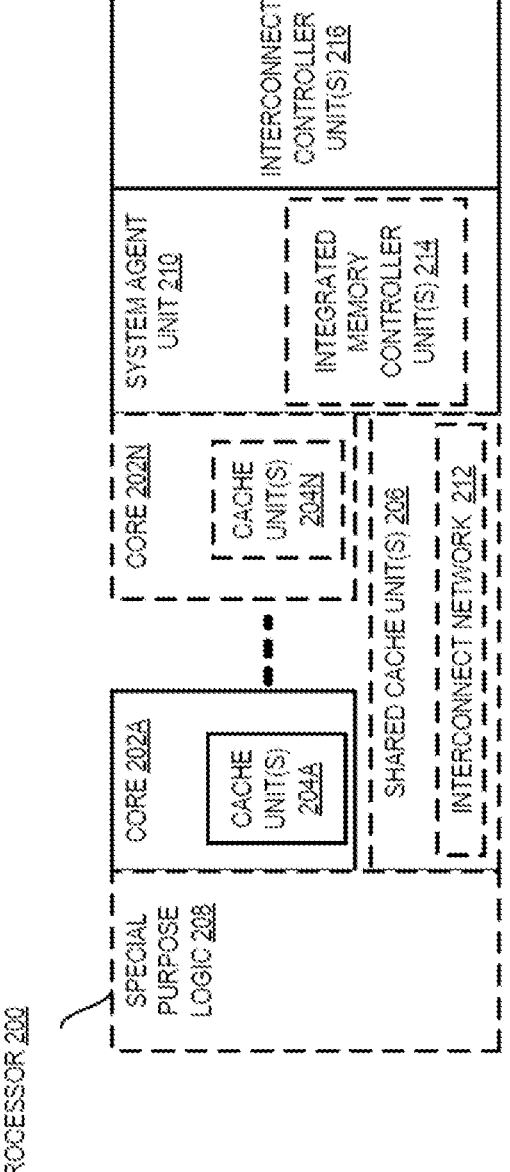
Figure 3A:
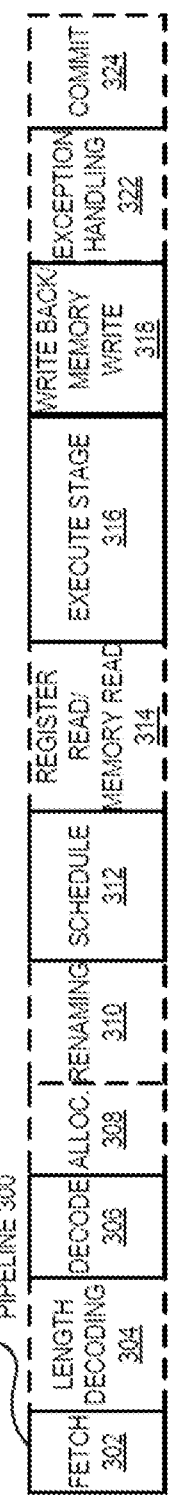
Figure 3B:
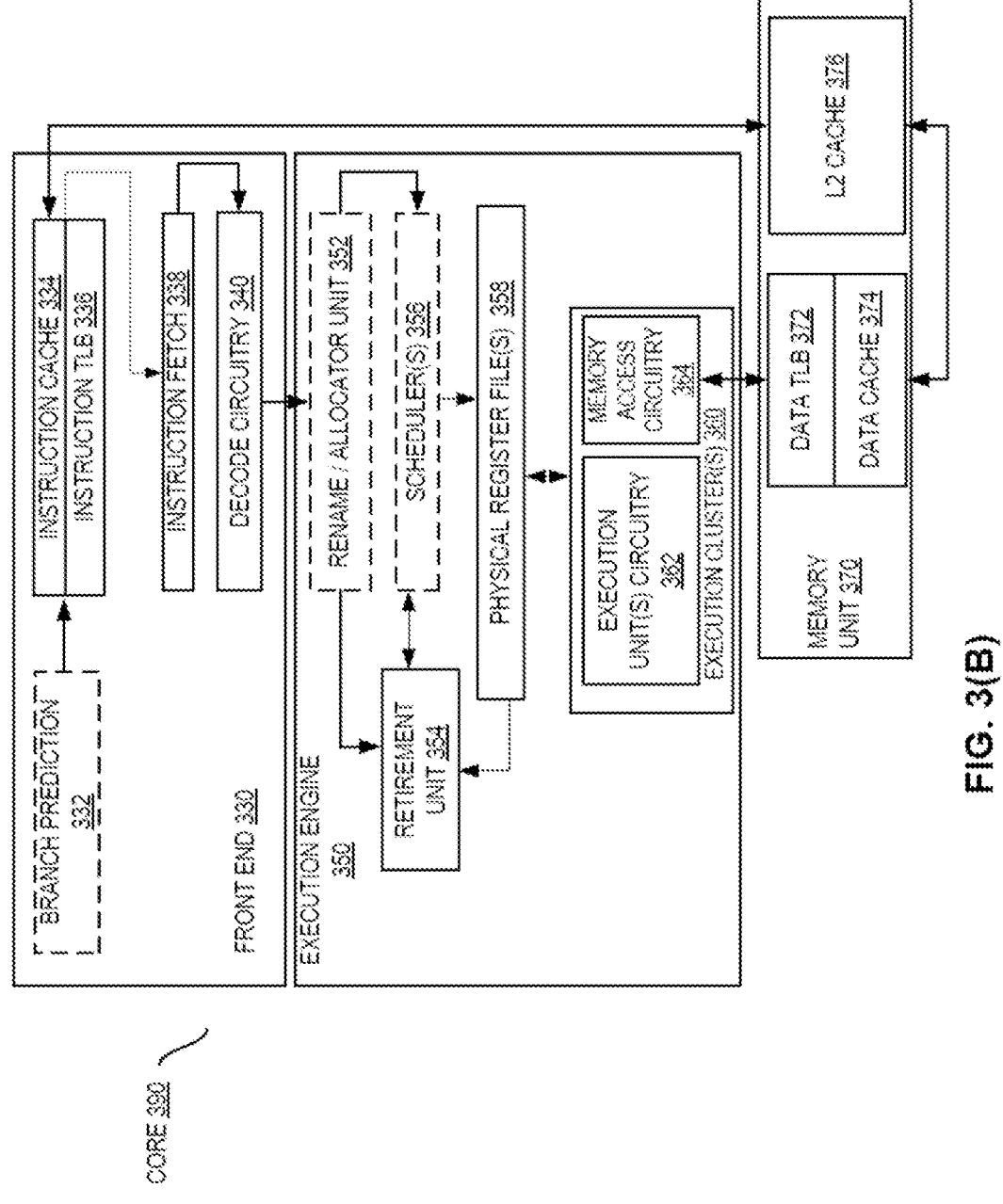
Figure 4:
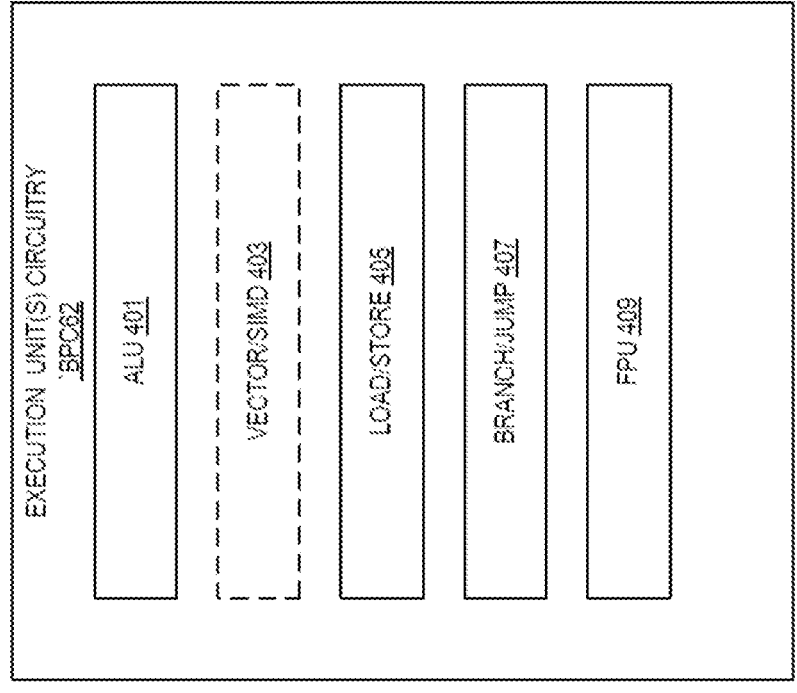
Figure 5:
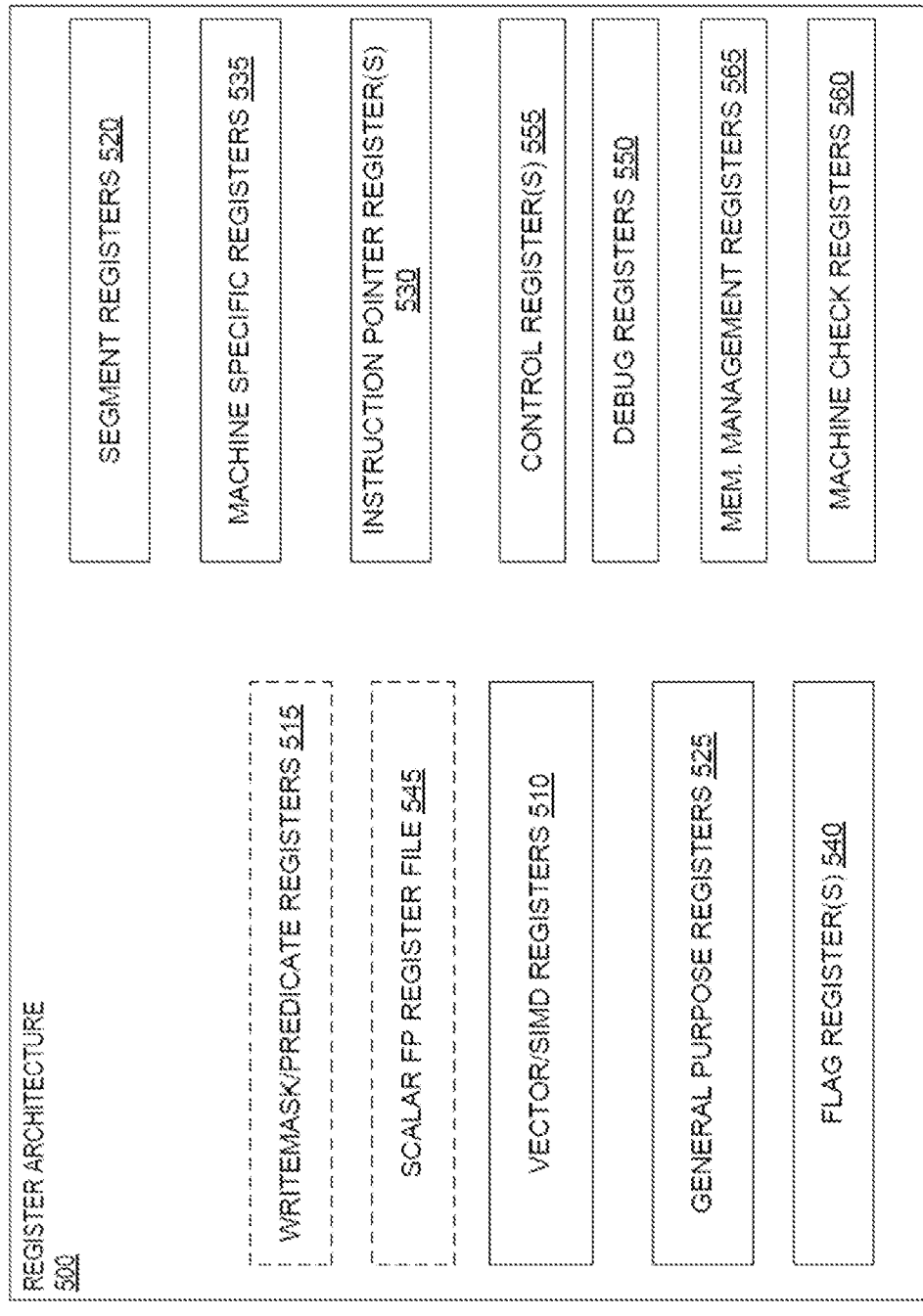
Figure 6:
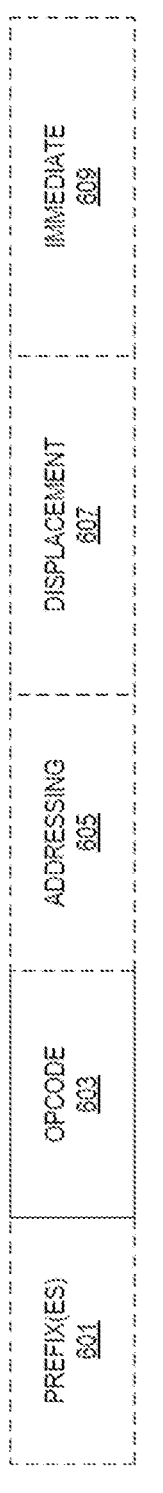
Figure 7:
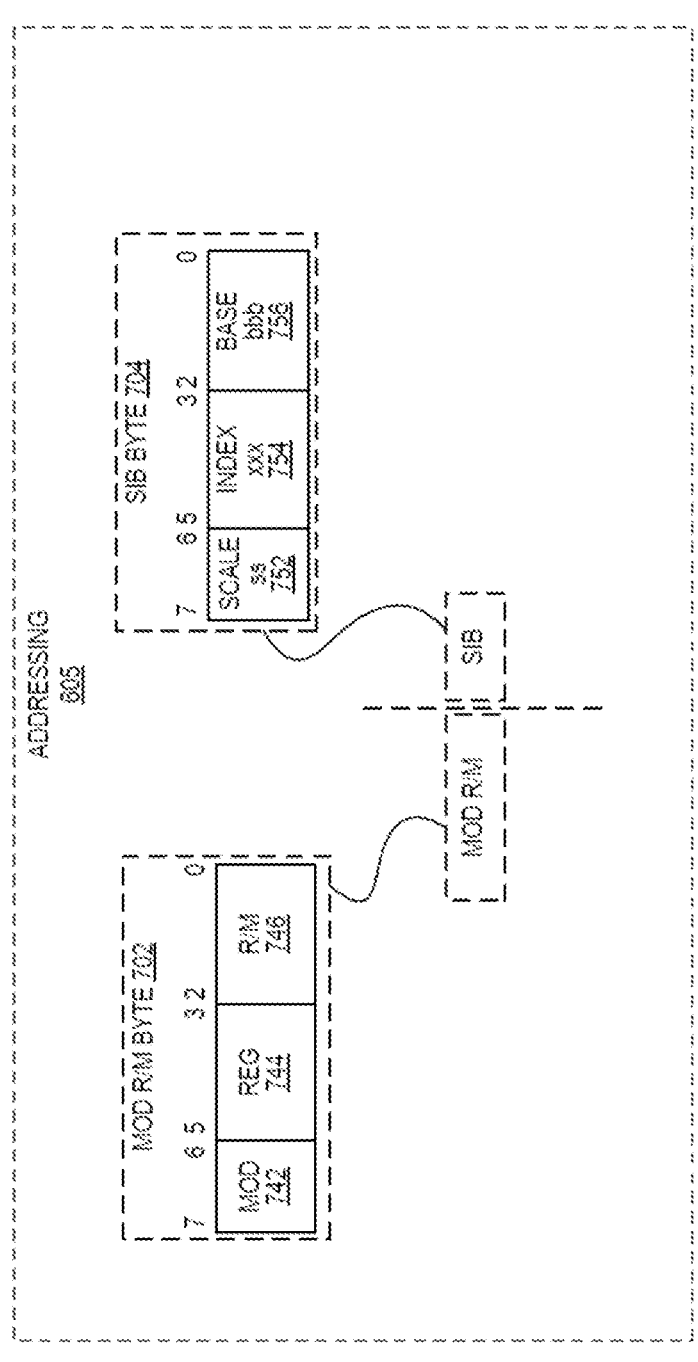
Figures 8, 9A, 9B, 9C, 9D:
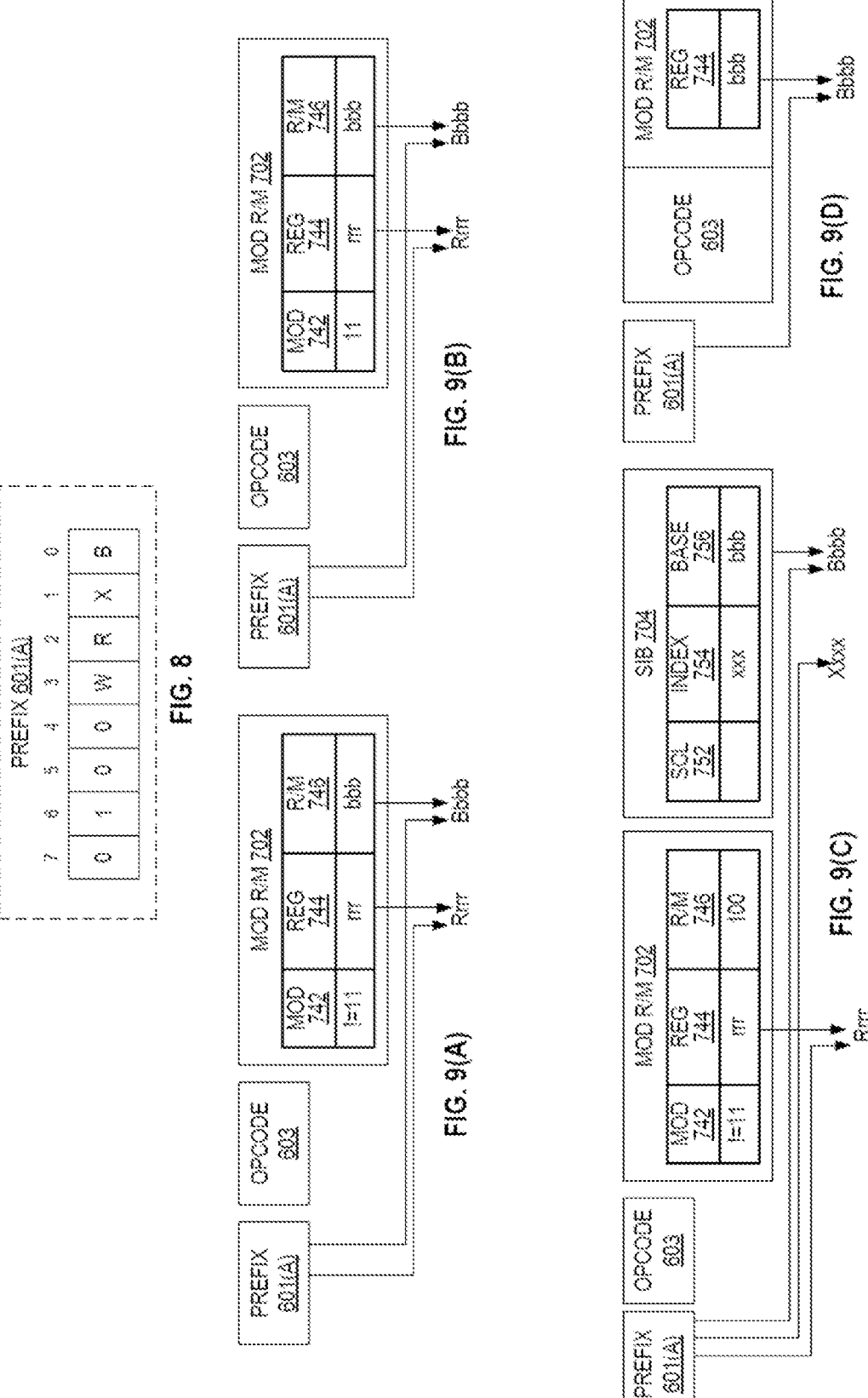
Figures 10A, 10B:
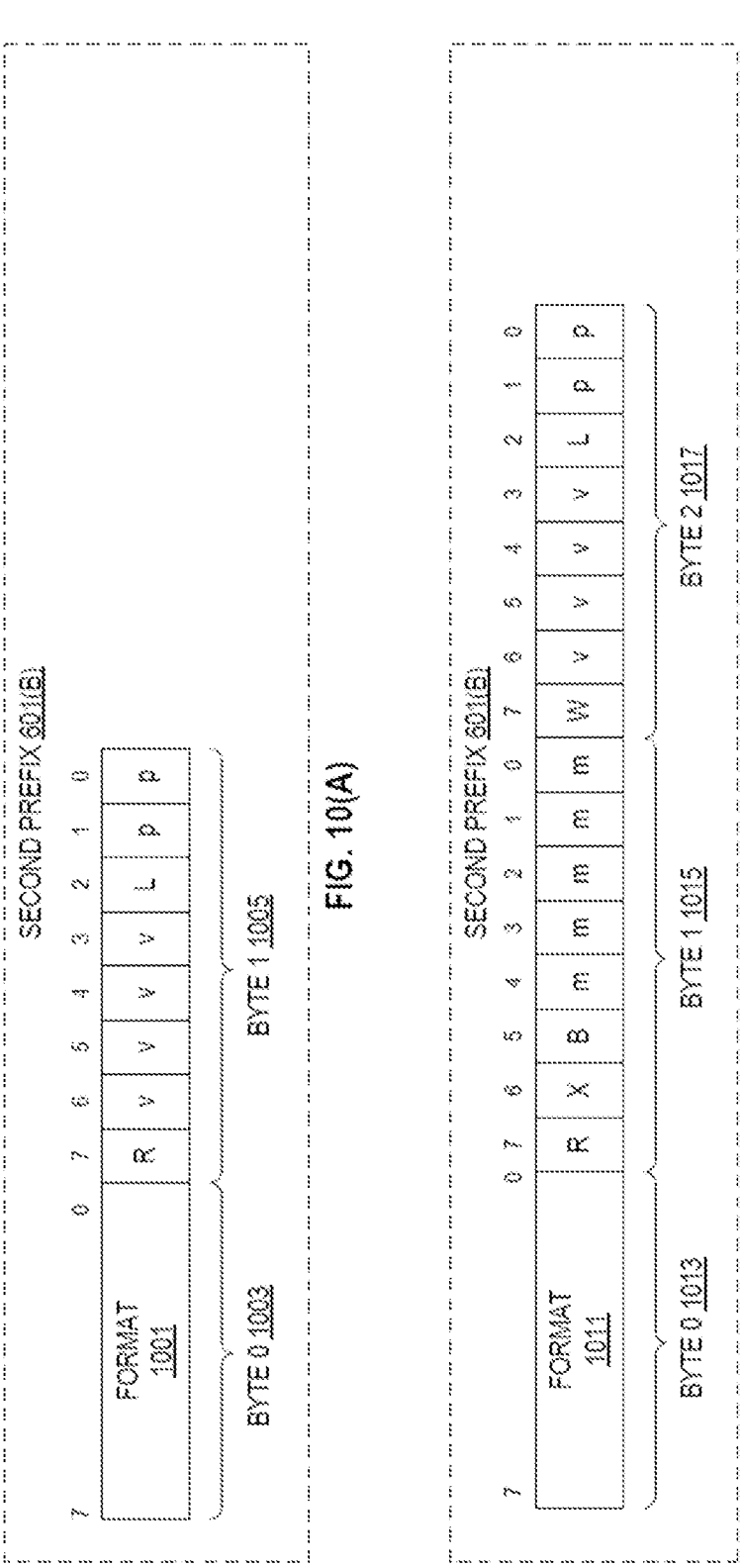
Figure 11:
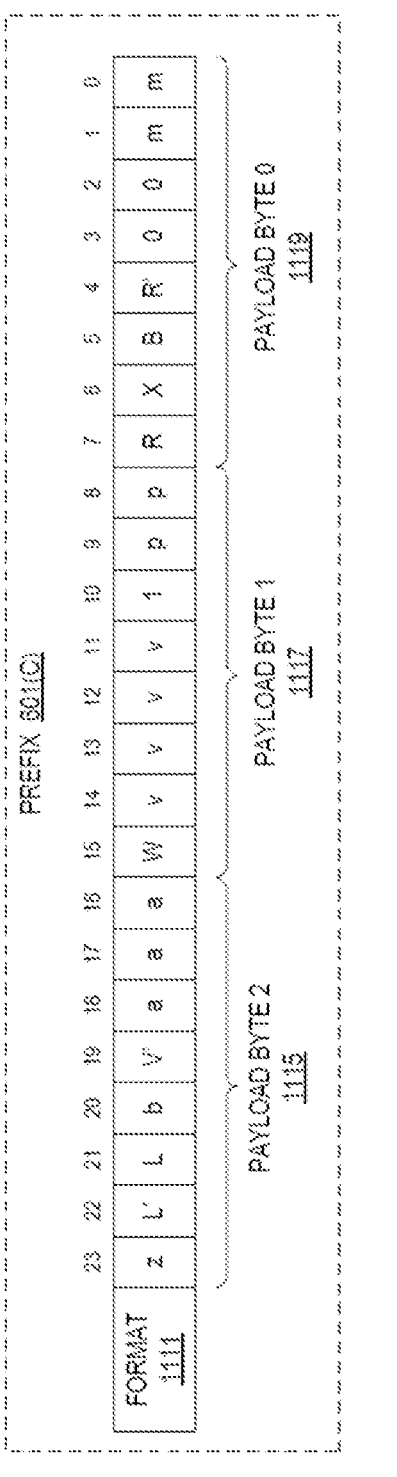
Figure 12:
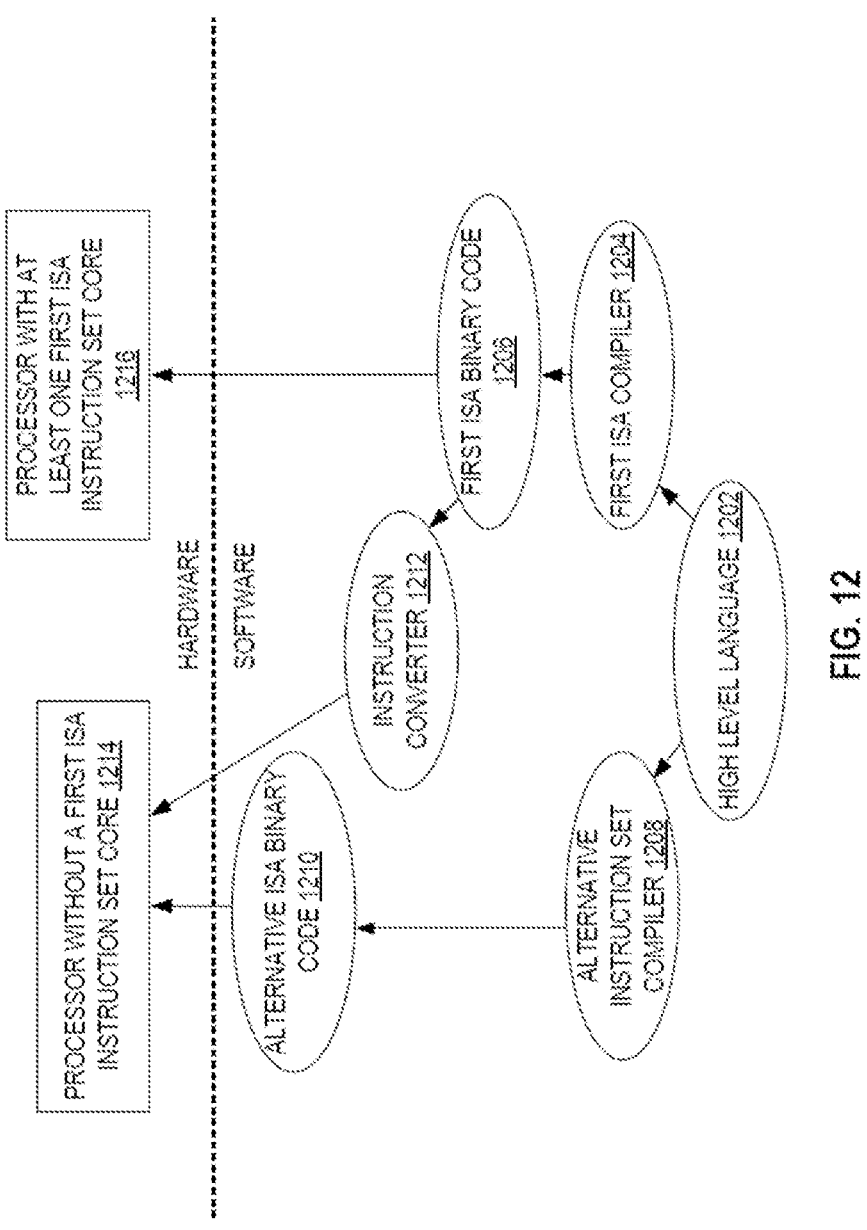
Figure 13:
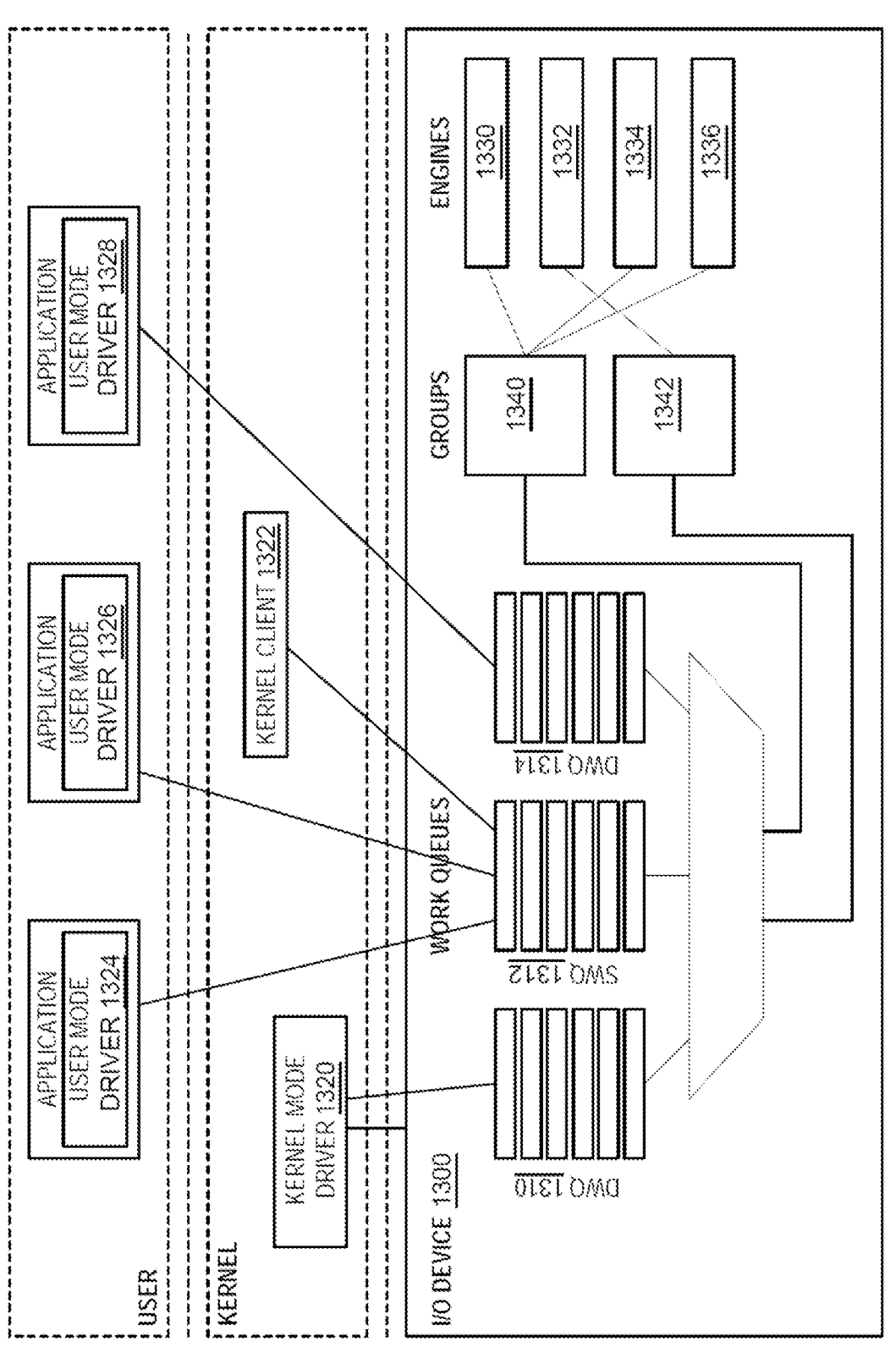
Figure 14:
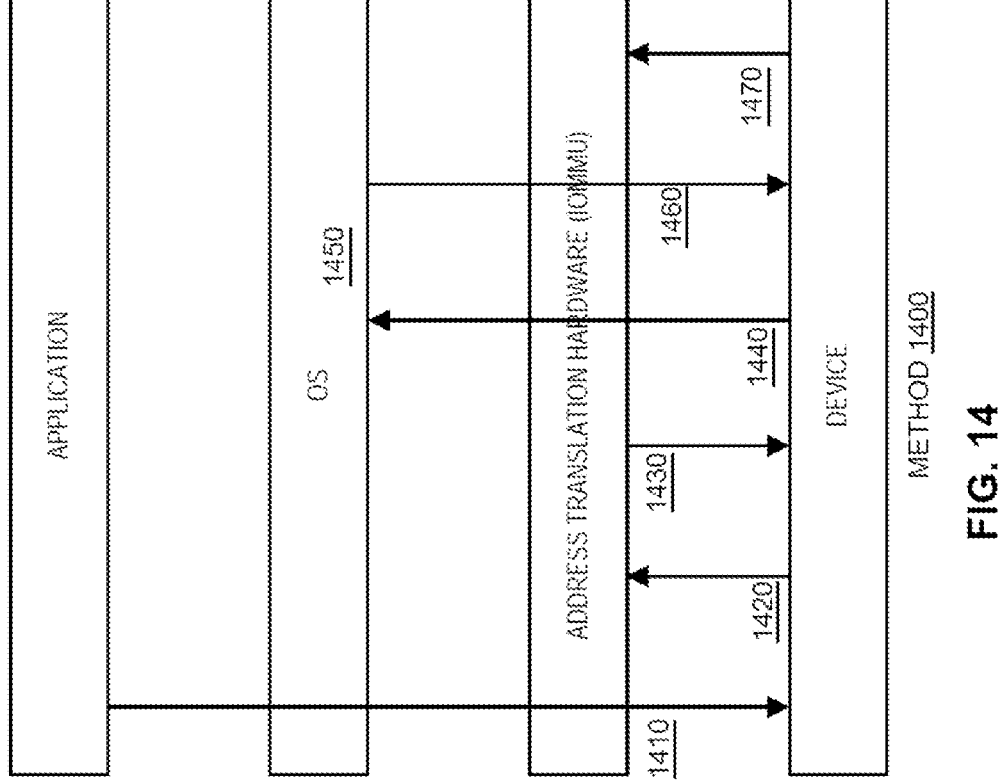
Figure 15:
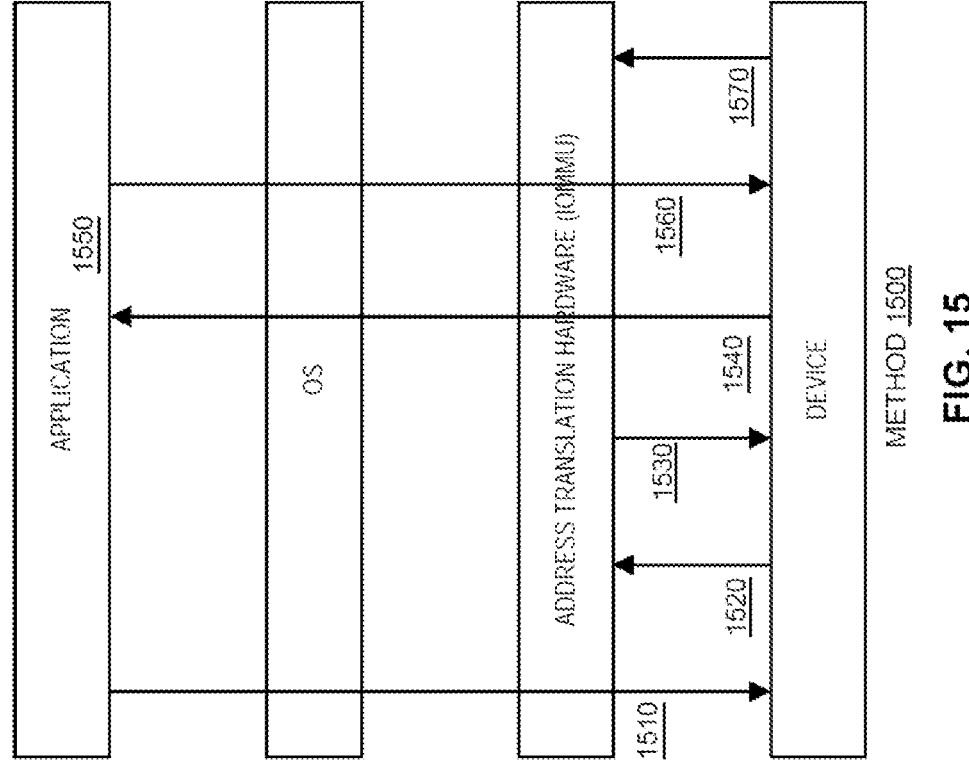
Figure 16:
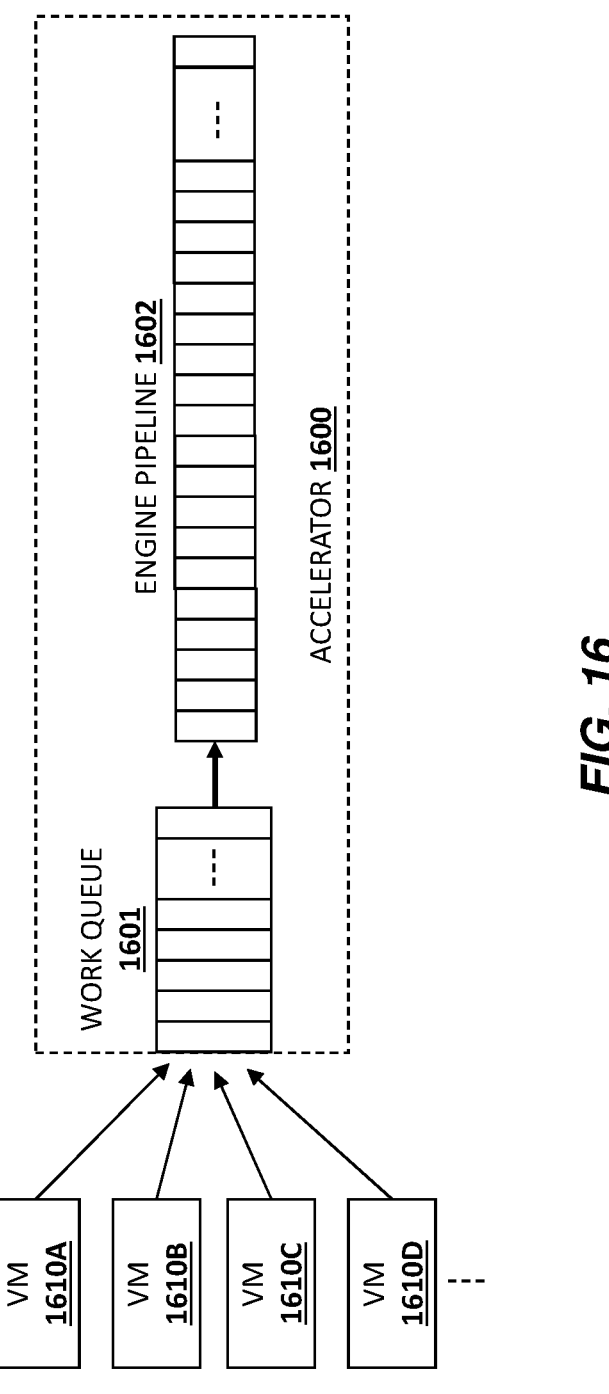
Figure 17:
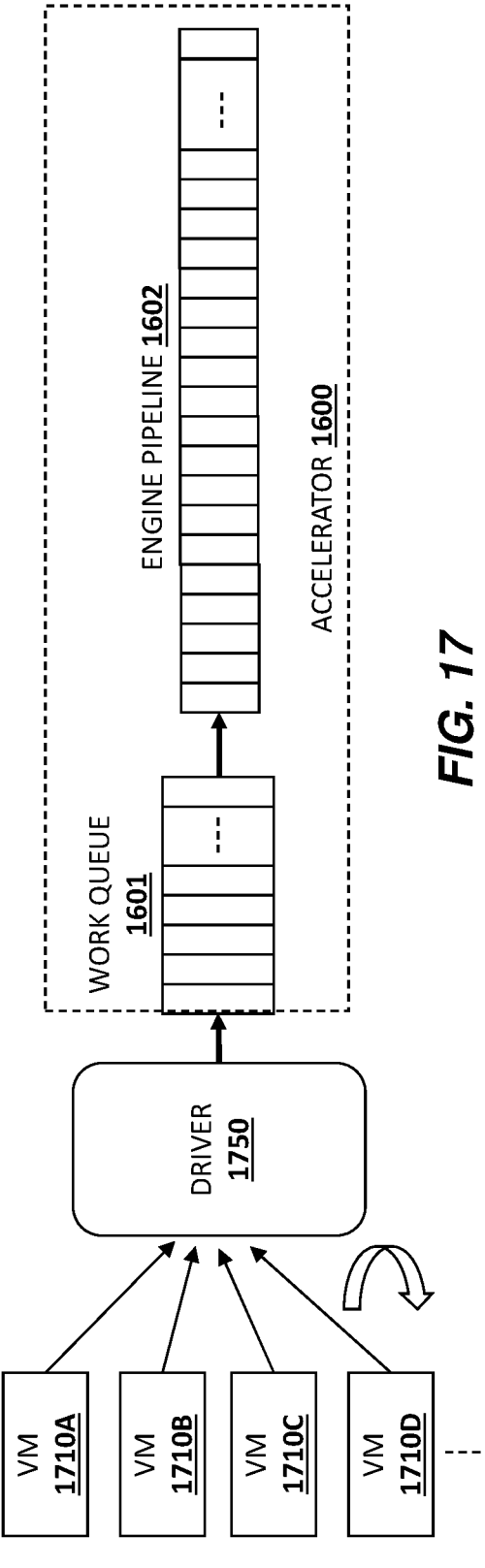
Figure 18:
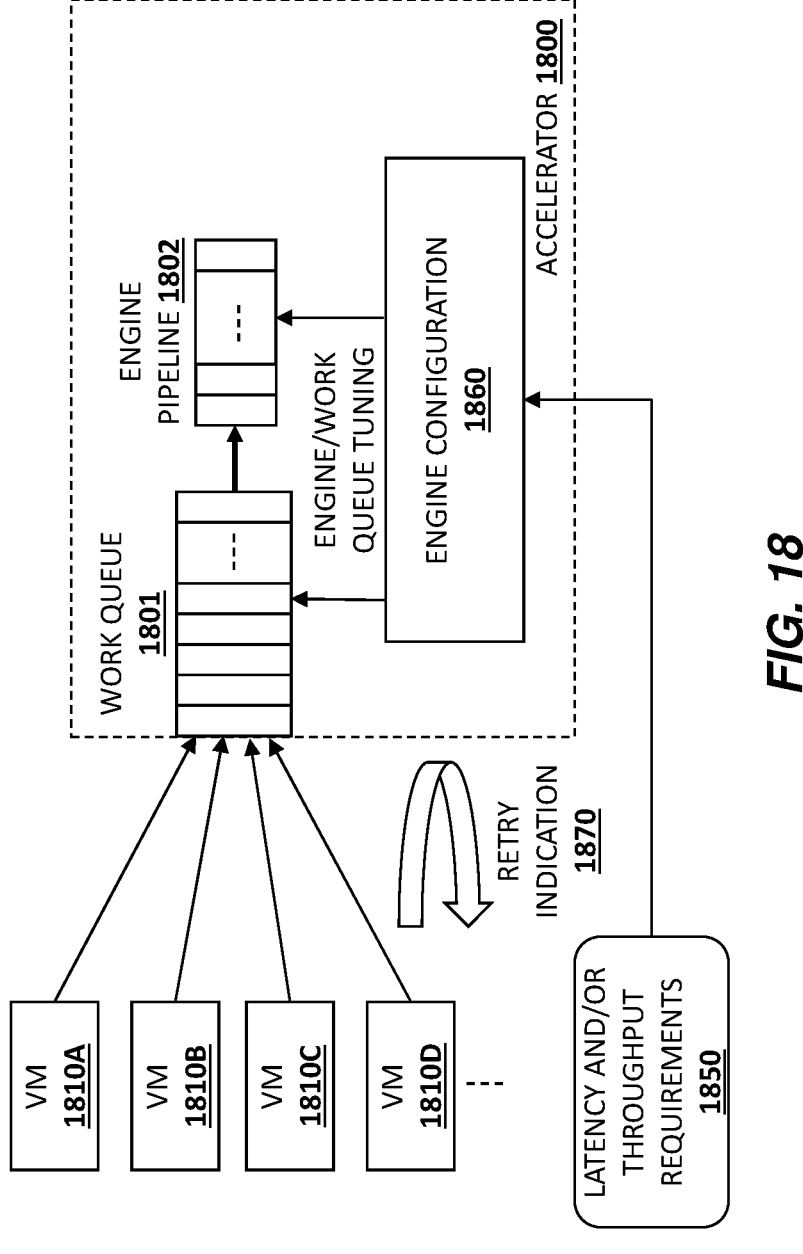
Figure 19:
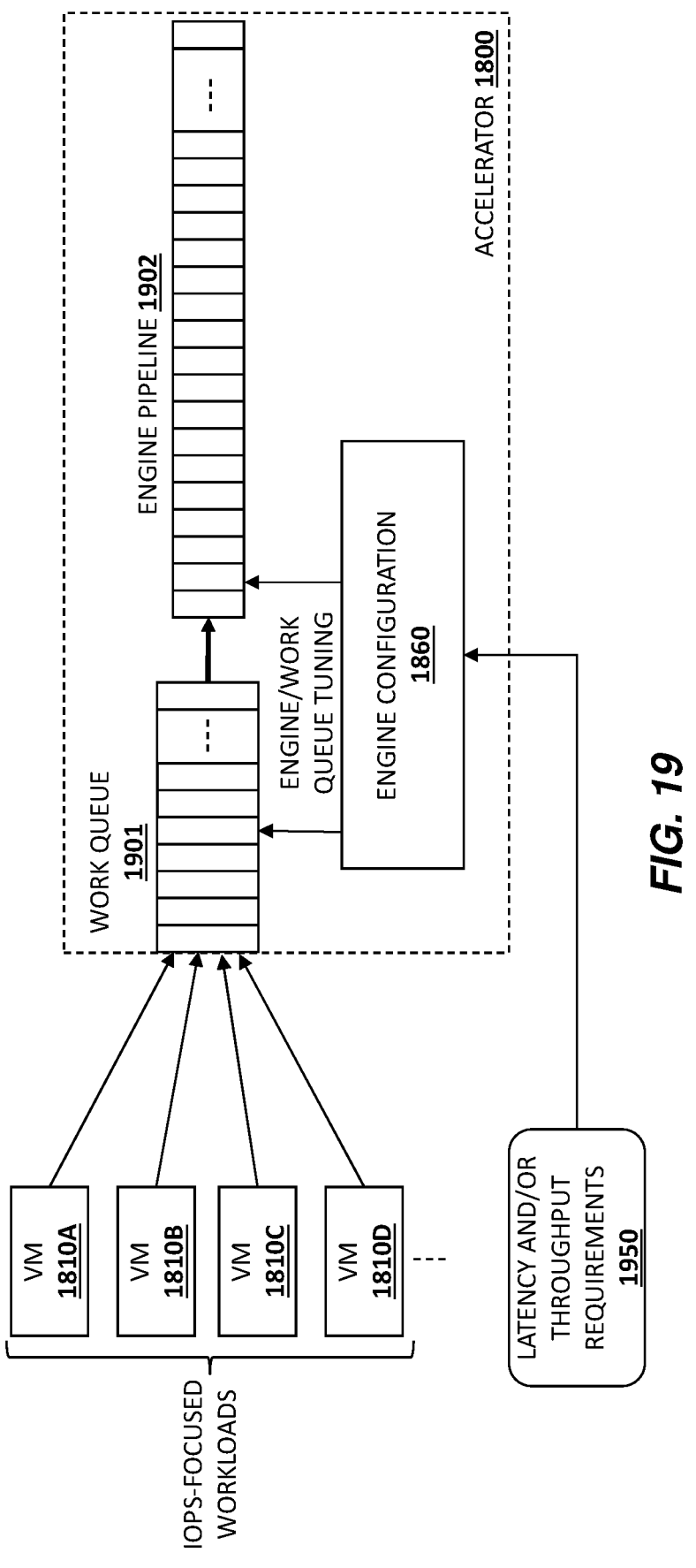
Figure 20:
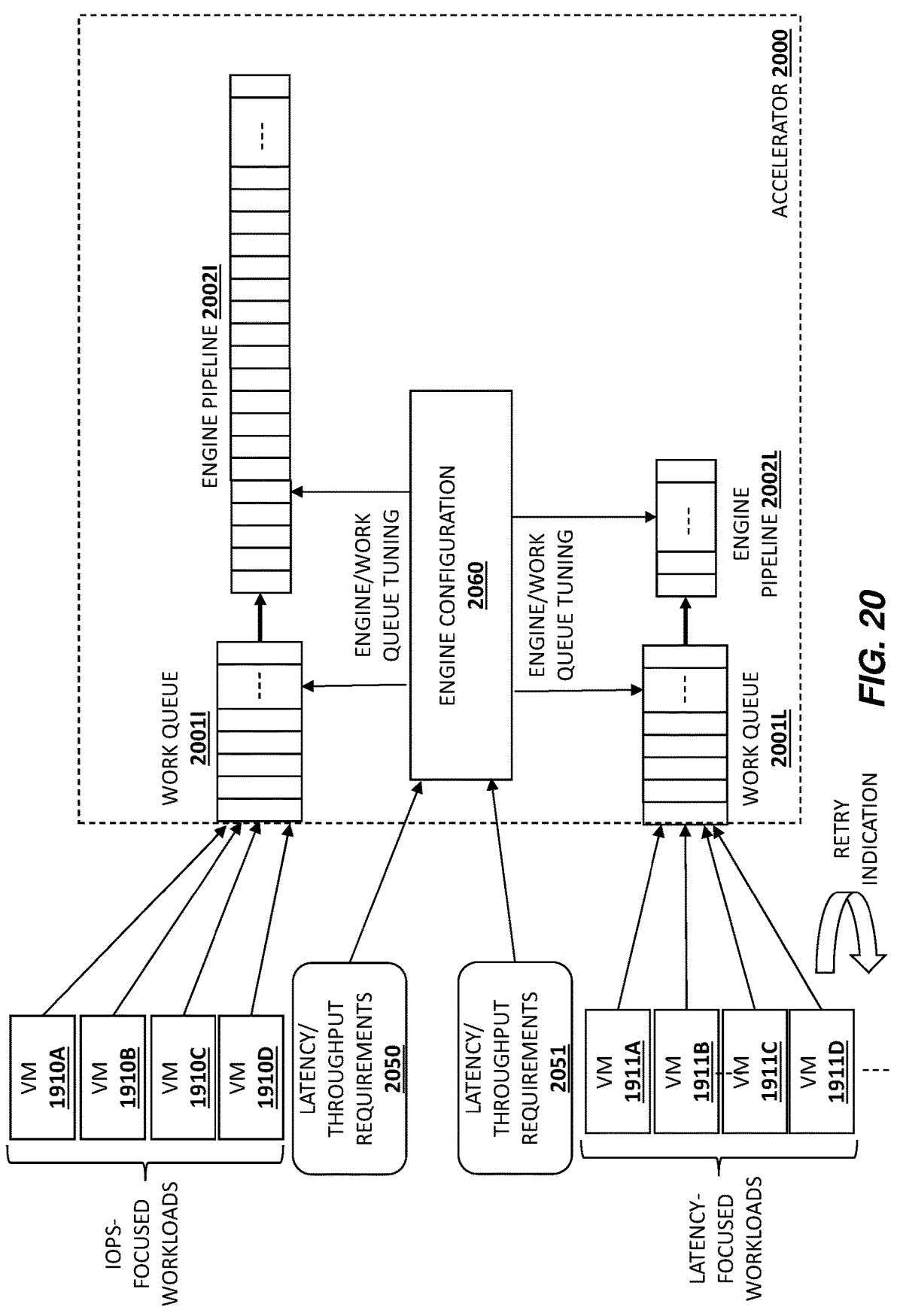

A better understanding of the present invention can be obtained from the following detailed description in conjunction with the following drawings, in which:

FIG. 1 illustrates an example computer system architecture;

FIG. 2 illustrates a processor comprising a plurality of cores;

FIG. 3A illustrates a plurality of stages of a processing pipeline;

FIG. 3B illustrates details of one embodiment of a core;

FIG. 4 illustrates execution circuitry in accordance with one embodiment;

FIG. 5 illustrates one embodiment of a register architecture;

FIG. 6 illustrates one example of an instruction format;

FIG. 7 illustrates addressing techniques in accordance with one embodiment;

FIG. 8 illustrates one embodiment of an instruction prefix;

FIGS. 9A-D illustrate embodiments of how the R, X, and B fields of the prefix are used;

FIGS. 10A-B illustrate examples of a second instruction prefix;

FIG. 11 illustrates payload bytes of one embodiment of an instruction prefix;

FIG. 12 illustrates instruction conversion and binary translation implementations;

FIG. 13 illustrates a scalable device according to an embodiment of the invention;

FIG. 14 illustrates an example of a method for handling a page fault;

FIG. 15 illustrates another example of a method for handling a page fault according to an embodiment of the invention;

FIG. 16 illustrates an accelerator with a work queue and engine pipeline;

FIG. 17 illustrates an accelerator in which a driver submits work descriptors to a work queue on behalf of a plurality of virtual machines (VMs);

FIG. 18 illustrates an implementation in which engine configuration hardware configures a work queue and shallow engine pipeline in accordance with specified latency and/or throughput requirements;

FIG. 19 illustrates an implementation in which engine configuration hardware configures a work queue and deep engine pipeline in accordance with specified latency and/or throughput requirements;

FIG. 20 illustrates an implementation with differently configured work queues and engine pipelines to process work with different latency and/or workload requirements; and FIG. 21 illustrates a method in accordance with embodiments of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 1 illustrates embodiments of an exemplary system. Multiprocessor system 100 is a point-to-point interconnect system and includes a plurality of processors including a first processor 170 and a second processor 180 coupled via a point-to-point interconnect 150. In some embodiments, the first processor 170 and the second processor 180 are homogeneous. In some embodiments, first processor 170 and the second processor 180 are heterogenous.

Processors 170 and 180 are shown including integrated memory controller (IMC) units circuitry 172 and 182, respectively. Processor 170 also includes as part of its interconnect controller units point-to-point (P-P) interfaces 176 and 178; similarly, second processor 180 includes P-P interfaces 186 and 188. Processors 170, 180 may exchange information via the point-to-point (P-P) interconnect 150 using P-P interface circuits 178, 188. IMCs 172 and 182 couple the processors 170, 180 to respective memories, namely a memory 132 and a memory 134, which may be portions of main memory locally attached to the respective processors.

Processors 170, 180 may each exchange information with a chipset 190 via individual P-P interconnects 152, 154 using point to point interface circuits 176, 194, 186, 198. Chipset 190 may optionally exchange information with a coprocessor 138 via a high-performance interface 192. In some embodiments, the coprocessor 138 is a special-purpose processor, such as, for example, a high-throughput MIC processor, a network or communication processor, compression engine, graphics processor, GPGPU, embedded processor, or the like.

A shared cache (not shown) may be included in either processor 170, 180 or outside of both processors, yet connected with the processors via P-P interconnect, such that either or both processors' local cache information may be stored in the shared cache if a processor is placed into a low power mode.

Chipset 190 may be coupled to a first interconnect 116 via an interface 196. In some embodiments, first interconnect 116 may be a Peripheral Component Interconnect (PCI) interconnect, or an interconnect such as a PCI Express interconnect or another I/O interconnect. In some embodiments, one of the interconnects couples to a power control unit (PCU) 117, which may include circuitry, software, and/or firmware to perform power management operations with regard to the processors 170, 180 and/or co-processor 138. PCU 117 provides control information to a voltage regulator to cause the voltage regulator to generate the appropriate regulated voltage. PCU 117 also provides control information to control the operating voltage generated. In various embodiments, PCU 117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 117 is illustrated as being present as logic separate from the processor 170 and/or processor 180. In other cases, PCU 117 may execute on a given one or more of cores (not shown) of processor 170 or 180. In some cases, PCU 117 may be implemented as a microcontroller (dedicated or general-purpose) or other control logic configured to execute its own dedicated power management code, sometimes referred to as P-code. In yet other embodiments, power management operations to be performed by PCU 117 may be implemented externally to a processor, such as by way of a separate power management integrated circuit (PMIC) or another component external to the processor. In yet other embodiments, power management operations to be performed by PCU 117 may be implemented within BIOS or other system software.

Various I/O devices 114 may be coupled to first interconnect 116, along with an interconnect (bus) bridge 118 which couples first interconnect 116 to a second interconnect 120. In some embodiments, one or more additional processor(s) 115, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 116. In some embodiments, second interconnect 120 may be a low pin count (LPC) interconnect. Various devices may be coupled to second interconnect 120 including, for example, a keyboard and/or mouse 122, communication devices 127 and a storage unit circuitry 128. Storage unit circuitry 128 may be a disk drive or other mass storage device which may include instructions/code and data 130, in some embodiments. Further, an audio I/O 124 may be coupled to second interconnect 120. Note that other architectures than the point-to-point architecture described above are possible. For example, instead of the point-to-point architecture, a system such as multiprocessor system 100 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

FIG. 2 illustrates a block diagram of embodiments of a processor 200 that may have more than one core, may have an integrated memory controller, and may have integrated graphics. The solid lined boxes illustrate a processor 200 with a single core 202A, a system agent 210, a set of one or more interconnect controller units circuitry 216, while the optional addition of the dashed lined boxes illustrates an alternative processor 200 with multiple cores 202(A)-(N), a set of one or more integrated memory controller unit(s) circuitry 214 in the system agent unit circuitry 210, and special purpose logic 208, as well as a set of one or more interconnect controller units circuitry 216. Note that the processor 200 may be one of the processors 170 or 180, or co-processor 138 or 115 of FIG. 1.

Thus, different implementations of the processor 200 may include: 1) a CPU with the special purpose logic 208 being integrated graphics and/or scientific (throughput) logic (which may include one or more cores, not shown), and the cores 202(A)-(N) being one or more general purpose cores (e.g., general purpose in-order cores, general purpose out-of-order cores, or a combination of the two); 2) a coprocessor with the cores 202(A)-(N) being a large number of special purpose cores intended primarily for graphics and/or scientific (throughput); and 3) a coprocessor with the cores 202(A)-(N) being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

A memory hierarchy includes one or more levels of cache unit(s) circuitry 204(A)-(N) within the cores 202(A)-(N), a set of one or more shared cache units circuitry 206, and external memory (not shown) coupled to the set of integrated memory controller units circuitry 214. The set of one or more shared cache units circuitry 206 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 212 interconnects the special purpose logic 208 (e.g., integrated graphics logic), the set of shared cache units circuitry 206, and the system agent unit circuitry 210, alternative embodiments use any number of well-known techniques for interconnecting such units. In some embodiments, coherency is maintained between one or more of the shared cache units circuitry 206 and cores 202(A)-(N).

In some embodiments, one or more of the cores 202(A)-(N) are capable of multi-threading. The system agent unit circuitry 210 includes those components coordinating and operating cores 202(A)-(N). The system agent unit circuitry 210 may include, for example, power control unit (PCU) circuitry and/or display unit circuitry (not shown). The PCU may be or may include logic and components needed for regulating the power state of the cores 202(A)-(N) and/or the special purpose logic 208 (e.g., integrated graphics logic). The display unit circuitry is for driving one or more externally connected displays.

The cores 202(A)-(N) may be homogenous or heterogeneous in terms of architecture instruction set; that is, two or more of the cores 202(A)-(N) may be capable of executing the same instruction set, while other cores may be capable of executing only a subset of that instruction set or a different instruction set.

Exemplary Core Architectures

In-Order and Out-of-Order Core Block Diagram

FIG. 3(A) is a block diagram illustrating both an exemplary in-order pipeline and an exemplary register renaming, out-of-order issue/execution pipeline according to embodiments of the invention. FIG. 3(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 3(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 3(A), a processor pipeline 300 includes a fetch stage 302, an optional length decode stage 304, a decode stage 306, an optional allocation stage 308, an optional renaming stage 310, a scheduling (also known as a dispatch or issue) stage 312, an optional register read/memory read stage 314, an execute stage 316, a write back/memory write stage 318, an optional exception handling stage 322, and an optional commit stage 324. One or more operations can be performed in each of these processor pipeline stages. For example, during the fetch stage 302, one or more instructions are fetched from instruction memory, during the decode stage 306, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 306 and the register read/memory read stage 314 may be combined into one pipeline stage. In one embodiment, during the execute stage 316, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 300 as follows: 1) the instruction fetch 338 performs the fetch and length decoding stages 302 and 304; 2) the decode unit circuitry 340 performs the decode stage 306; 3) the rename/allocator unit circuitry 352 performs the allocation stage 308 and renaming stage 310; 4) the scheduler unit(s) circuitry 356 performs the schedule stage 312; 5) the physical register file(s) unit(s) circuitry 358 and the memory unit circuitry 370 perform the register read/memory read stage 314; the execution cluster 360 perform the execute stage 316; 6) the memory unit circuitry 370 and the physical register file(s) unit(s) circuitry 358 perform the write back/memory write stage 318; 7) various units (unit circuitry) may be involved in the exception handling stage 322; and 8) the retirement unit circuitry 354 and the physical register file(s) unit(s) circuitry 358 perform the commit stage 324.

FIG. 3(B) shows processor core 390 including front-end unit circuitry 330 coupled to an execution engine unit circuitry 350, and both are coupled to a memory unit circuitry 370. The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, coprocessor core, general purpose computing graphics processing unit (GPGPU) core, graphics core, or the like.

The front end unit circuitry 330 may include branch prediction unit circuitry 332 coupled to an instruction cache unit circuitry 334, which is coupled to an instruction translation lookaside buffer (TLB) 336, which is coupled to instruction fetch unit circuitry 338, which is coupled to decode unit circuitry 340. In one embodiment, the instruction cache unit circuitry 334 is included in the memory unit circuitry 370 rather than the front-end unit circuitry 330. The decode unit circuitry 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 340 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 390 includes a microcode ROM (not shown) or other medium that stores microcode for certain macroinstructions (e.g., in decode unit circuitry 340 or otherwise within the front end unit circuitry 330). In one embodiment, the decode unit circuitry 340 includes a micro-operation (micro-op) or operation cache (not shown) to hold/cache decoded operations, micro-tags, or micro-operations generated during the decode or other stages of the processor pipeline 300. The decode unit circuitry 340 may be coupled to rename/allocator unit circuitry 352 in the execution engine unit circuitry 350.

The execution engine circuitry 350 includes the rename/allocator unit circuitry 352 coupled to a retirement unit circuitry 354 and a set of one or more scheduler(s) circuitry 356. The scheduler(s) circuitry 356 represents any number of different schedulers, including reservations stations, central instruction window, etc. In some embodiments, the scheduler(s) circuitry 356 can include arithmetic logic unit (ALU) scheduler/scheduling circuitry, ALU queues, arithmetic generation unit (AGU) scheduler/scheduling circuitry, AGU queues, etc. The scheduler(s) circuitry 356 is coupled to the physical register file(s) circuitry 358. Each of the physical register file(s) circuitry 358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 358 includes vector registers unit circuitry, writemask registers unit circuitry, and scalar register unit circuitry. These register units may provide architectural vector registers, vector mask registers, general-purpose registers, etc. The physical register file(s) unit(s) circuitry 358 is overlapped by the retirement unit circuitry 354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 354 and the physical register file(s) circuitry 358 are coupled to the execution cluster(s) 360. The execution cluster(s) 360 includes a set of one or more execution units circuitry 362 and a set of one or more memory access circuitry 364. The execution units circuitry 362 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 356, physical register file(s) unit(s) circuitry 358, and execution cluster(s) 360 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 364). It should also be understood that where separate pipelines are used, one or more of these pipelines may be out-of-order issue/execution and the rest in-order.

In some embodiments, the execution engine unit circuitry 350 may perform load store unit (LSU) address/data pipelining to an Advanced Microcontroller Bus (AHB) interface (not shown), and address phase and writeback, data phase load, store, and branches.

The set of memory access circuitry 364 is coupled to the memory unit circuitry 370, which includes data TLB unit circuitry 372 coupled to a data cache circuitry 374 coupled to a level 2 (L2) cache circuitry 376. In one exemplary embodiment, the memory access units circuitry 364 may include a load unit circuitry, a store address unit circuit, and a store data unit circuitry, each of which is coupled to the data TLB circuitry 372 in the memory unit circuitry 370. The instruction cache circuitry 334 is further coupled to a level 2 (L2) cache unit circuitry 376 in the memory unit circuitry 370. In one embodiment, the instruction cache 334 and the data cache 374 are combined into a single instruction and data cache (not shown) in L2 cache unit circuitry 376, a level 3 (L3) cache unit circuitry (not shown), and/or main memory. The L2 cache unit circuitry 376 is coupled to one or more other levels of cache and eventually to a main memory.

The core 390 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 390 includes logic to support a packed data instruction set extension (e.g., AVX1, AVX2), thereby allowing the operations used by many multimedia applications to be performed using packed data.

Exemplary Execution Unit(s) Circuitry

FIG. 4 illustrates embodiments of execution unit(s) circuitry, such as execution unit(s) circuitry 362 of FIG. 3(B). As illustrated, execution unit(s) circuitry 362 may include one or more ALU circuits 401, vector/SIMD unit circuits 403, load/store unit circuits 405, and/or branch/jump unit circuits 407. ALU circuits 401 perform integer arithmetic and/or Boolean operations. Vector/SIMD unit circuits 403 perform vector/SIMD operations on packed data (such as SIMD/vector registers). Load/store unit circuits 405 execute load and store instructions to load data from memory into registers or store from registers to memory. Load/store unit circuits 405 may also generate addresses. Branch/jump unit circuits 407 cause a branch or jump to a memory address depending on the instruction. Floating-point unit (FPU) circuits 409 perform floating-point arithmetic. The width of the execution unit(s) circuitry 362 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

FIG. 5 is a block diagram of a register architecture 500 according to some embodiments. As illustrated, there are vector/SIMD registers 510 that vary from 128-bit to 1,024 bits width. In some embodiments, the vector/SIMD registers 510 are physically 512-bits and, depending upon the mapping, only some of the lower bits are used. For example, in some embodiments, the vector/SIMD registers 510 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 500 includes writemask/predicate registers 515. For example, in some embodiments, there are 8 writemask/predicate registers (sometimes called k0 through k7) that are each 16-bit, 32-bit, 64-bit, or 128-bit in size. Writemask/predicate registers 515 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 515 corresponds to a data element position of the destination. In other embodiments, the writemask/predicate registers 515 are scalable and consists of a set number of enable bits for a given vector element (e.g., 8 enable bits per 64-bit vector element).

The register architecture 500 includes a plurality of general-purpose registers 525. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 500 includes scalar floating-point register 545 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 540 (e.g., EFLAGS, RFLAGS, etc.) store status and control information for arithmetic, compare, and system operations. For example, the one or more flag registers 540 may store condition code information such as carry, parity, auxiliary carry, zero, sign, and overflow. In some embodiments, the one or more flag registers 540 are called program status and control registers.

Segment registers 520 contain segment points for use in accessing memory. In some embodiments, these registers are referenced by the names CS, DS, SS, ES, FS, and GS.

Machine specific registers (MSRs) 535 control and report on processor performance. Most MSRs 535 handle system-related functions and are not accessible to an application program. Machine check registers 560 consist of control, status, and error reporting MSRs that are used to detect and report on hardware errors.

One or more instruction pointer register(s) 530 store an instruction pointer value. Control register(s) 555 (e.g., CR0-CR4) determine the operating mode of a processor (e.g., processor 170, 180, 138, 115, and/or 200) and the characteristics of a currently executing task. Debug registers 550 control and allow for the monitoring of a processor or core's debugging operations.

Memory management registers 565 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

FIG. 6 illustrates embodiments of an instruction format. As illustrated, an instruction may include multiple components including, but not limited to, one or more fields for: one or more prefixes 601, an opcode 603, addressing information 605 (e.g., register identifiers, memory addressing information, etc.), a displacement value 607, and/or an immediate 609. Note that some instructions utilize some or all of the fields of the format whereas others may only use the field for the opcode 603. In some embodiments, the order illustrated is the order in which these fields are to be encoded, however, it should be appreciated that in other embodiments these fields may be encoded in a different order, combined, etc.

The prefix(es) field(s) 601, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 603 is used to at least partially define the operation to be performed upon a decoding of the instruction. In some embodiments, a primary opcode encoded in the opcode field 603 is 1, 2, or 3 bytes in length. In other embodiments, a primary opcode can be a different length. An additional 3-bit opcode field is sometimes encoded in another field.

The addressing field 605 is used to address one or more operands of the instruction, such as a location in memory or one or more registers. FIG. 7 illustrates embodiments of the addressing field 605. In this illustration, an optional ModR/M byte 702 and an optional Scale, Index, Base (SIB) byte 704 are shown. The ModR/M byte 702 and the SIB byte 704 are used to encode up to two operands of an instruction, each of which is a direct register or effective memory address. Note that each of these fields are optional in that not all instructions include one or more of these fields. The MOD R/M byte 702 includes a MOD field 742, a register field 744, and R/M field 746.

The content of the MOD field 742 distinguishes between memory access and non-memory access modes. In some embodiments, when the MOD field 742 has a value of b11, a register-direct addressing mode is utilized, and otherwise register-indirect addressing is used.

The register field 744 may encode either the destination register operand or a source register operand, or may encode an opcode extension and not be used to encode any instruction operand. The content of register index field 744, directly or through address generation, specifies the locations of a source or destination operand (either in a register or in memory). In some embodiments, the register field 744 is supplemented with an additional bit from a prefix (e.g., prefix 601) to allow for greater addressing.

The R/M field 746 may be used to encode an instruction operand that references a memory address, or may be used to encode either the destination register operand or a source register operand. Note the R/M field 746 may be combined with the MOD field 742 to dictate an addressing mode in some embodiments.

The SIB byte 704 includes a scale field 752, an index field 754, and a base field 756 to be used in the generation of an address. The scale field 752 indicates scaling factor. The index field 754 specifies an index register to use. In some embodiments, the index field 754 is supplemented with an additional bit from a prefix (e.g., prefix 601) to allow for greater addressing. The base field 756 specifies a base register to use. In some embodiments, the base field 756 is supplemented with an additional bit from a prefix (e.g., prefix 601) to allow for greater addressing. In practice, the content of the scale field 752 allows for the scaling of the content of the index field 754 for memory address generation (e.g., for address generation that uses $2^{scale}*$index+base).

Some addressing forms utilize a displacement value to generate a memory address. For example, a memory address may be generated according to $2^{scale}*$index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 607 provides this value. Additionally, in some embodiments, a displacement factor usage is encoded in the MOD field of the addressing field 605 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 607.

In some embodiments, an immediate field 609 specifies an immediate for the instruction. An immediate may be encoded as a 1-byte value, a 2-byte value, a 4-byte value, etc.

FIG. 8 illustrates embodiments of a first prefix 601(A). In some embodiments, the first prefix 601(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 601(A) may specify up to three registers using 3-bit fields depending on the format: 1) using the reg field 744 and the R/M field 746 of the Mod R/M byte 702; 2) using the Mod R/M byte 702 with the SIB byte 704 including using the reg field 744 and the base field 756 and index field 754; or 3) using the register field of an opcode.

In the first prefix 601(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 744 and MOD R/M R/M field 746 alone can each only address 8 registers.

In the first prefix 601(A), bit position 2 (R) may an extension of the MOD R/M reg field 744 and may be used to modify the ModR/M reg field 744 when that field encodes a general purpose register, a 64-bit packed data register (e.g., a SSE register), or a control or debug register. R is ignored when Mod R/M byte 702 specifies other registers or defines an extended opcode.

Bit position 1 (X) X bit may modify the SIB byte index field 754.

Bit position B (B) B may modify the base in the Mod R/M R/M field 746 or the SIB byte base field 756; or it may modify the opcode register field used for accessing general purpose registers (e.g., general purpose registers 525).

FIGS. 9(A)-(D) illustrate embodiments of how the R, X, and B fields of the first prefix 601(A) are used. FIG. 9(A) illustrates R and B from the first prefix 601(A) being used to extend the reg field 744 and R/M field 746 of the MOD R/M byte 702 when the SIB byte 704 is not used for memory addressing. FIG. 9(B) illustrates R and B from the first prefix 601(A) being used to extend the reg field 744 and R/M field 746 of the MOD R/M byte 702 when the SIB byte 704 is not used (register-register addressing). FIG. 9(C) illustrates R, X, and B from the first prefix 601(A) being used to extend the reg field 744 of the MOD R/M byte 702 and the index field 754 and base field 756 when the SIB byte 704 being used for memory addressing. FIG. 9(D) illustrates B from the first prefix 601(A) being used to extend the reg field 744 of the MOD R/M byte 702 when a register is encoded in the opcode 603.

FIGS. 10(A)-(B) illustrate embodiments of a second prefix 601(B). In some embodiments, the second prefix 601(B) is an embodiment of a VEX prefix. The second prefix 601(B) encoding allows instructions to have more than two operands, and allows SIMD vector registers (e.g., vector/SIMD registers 510) to be longer than 64-bits (e.g., 128-bit and 256-bit). The use of the second prefix 601(B) provides for three-operand (or more) syntax. For example, previous two-operand instructions performed operations such as A=A+B, which overwrites a source operand. The use of the second prefix 601(B) enables operands to perform nondestructive operations such as A=B+C.

In some embodiments, the second prefix 601(B) comes in two forms—a two-byte form and a three-byte form. The two-byte second prefix 601(B) is used mainly for 128-bit, scalar, and some 256-bit instructions; while the three-byte second prefix 601(B) provides a compact replacement of the first prefix 601(A) and 3-byte opcode instructions.

FIG. 10(A) illustrates embodiments of a two-byte form of the second prefix 601(B). In one example, a format field 1001 (byte 0 1003) contains the value C5H. In one example, byte 1 1005 includes a "R" value in bit[7]. This value is the complement of the same value of the first prefix 601(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 746 to encode the instruction operand that references a memory address or encode either the destination register operand or a source register operand.

Instructions that use this prefix may use the Mod R/M reg field 744 to encode either the destination register operand or a source register operand, be treated as an opcode extension and not used to encode any instruction operand.

For instruction syntax that support four operands, vvvv, the Mod R/M R/M field 746 and the Mod R/M reg field 744 encode three of the four operands. Bits[7:4] of the immediate 609 are then used to encode the third source register operand.

FIG. 10(B) illustrates embodiments of a three-byte form of the second prefix 601(B). in one example, a format field 1011 (byte 0 1013) contains the value C4H. Byte 1 1015 includes in bits[7:5] "R," "X," and "B" which are the complements of the same values of the first prefix 601(A). Bits[4:0] of byte 1 1015 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1017 is used similar to W of the first prefix 601(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 746 to encode the instruction operand that references a memory address or encode either the destination register operand or a source register operand.

Instructions that use this prefix may use the Mod R/M reg field 744 to encode either the destination register operand or a source register operand, be treated as an opcode extension and not used to encode any instruction operand.

For instruction syntax that support four operands, vvvv, the Mod R/M R/M field 746, and the Mod R/M reg field 744 encode three of the four operands. Bits[7:4] of the immediate 609 are then used to encode the third source register operand.

FIG. 11 illustrates embodiments of a third prefix 601(C). In some embodiments, the first prefix 601(A) is an embodiment of an EVEX prefix. The third prefix 601(C) is a four-byte prefix.

The third prefix 601(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 5) or predication utilize this prefix. Opmask register allow for conditional processing or selection control. Opmask instructions, whose source/destination operands are opmask registers and treat the content of an opmask register as a single value, are encoded using the second prefix 601(B).

The third prefix 601(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 601(C) is a format field 1111 that has a value, in one example, of 62H. Subsequent bytes are referred to as payload bytes 1115-1119 and collectively form a 24-bit value of P[23:0] providing specific capability in the form of one or more fields (detailed herein).

In some embodiments, P[1:0] of payload byte 1119 are identical to the low two mmmmm bits. P[3:2] are reserved in some embodiments. Bit P[4] (R') allows access to the high 16 vector register set when combined with P[7] and the ModR/M reg field 744. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 744 and ModR/M R/M field 746. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 601(A) and second prefix 611(B) and may serve as an opcode extension bit or operand size promotion.

P[18:16] specify the index of a register in the opmask (writemask) registers (e.g., writemask/predicate registers 515). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22: 21]). P[23] indicates support for merging-writemasking (e.g., when set to 0) or support for zeroing and merging-writemasking (e.g., when set to 1).

Exemplary embodiments of encoding of registers in instructions using the third prefix 601(C) are detailed in the following tables.

TABLE 1

| 32-Register Support in 64-bit Mode | | | | | |
|---|---|---|---|---|---|
| | 4 | 3 | [2:0] | REG. TYPE | COMMON USAGES |
| REG | R' | R | ModR/M reg | GPR, Vector | Destination or Source |
| VVVV | V' | | vvvv | GPR, Vector | 2nd Source or Destination |
| RM | X | B | ModR/ MR/M | GPR, Vector | 1st Source or Destination |
| BASE | 0 | B | ModR/ MR/M | GPR | Memory addressing |
| INDEX | 0 | X | SIB.index | GPR | Memory addressing |
| VIDX | V' | X | SIB.index | Vector | VSIB memory addressing |

TABLE 2

| Encoding Register Specifiers in 32-bit Mode | | | |
|---|---|---|---|
| | [2:0] | REG. TYPE | COMMON USAGES |
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
|---|---|---|---|
| | [2:0] | REG. TYPE | COMMON USAGES |
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1] | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 12 illustrates a block diagram contrasting the use of a software instruction converter to convert binary instructions in a source instruction set to binary instructions in a target instruction set according to certain implementations. In the illustrated embodiment, the instruction converter is a software instruction converter, although alternatively the instruction converter may be implemented in software, firmware, hardware, or various combinations thereof. FIG. 12 shows a program in a high level language 1202 may be compiled using a first ISA compiler 1204 to generate first ISA binary code 1206 that may be natively executed by a processor with at least one first instruction set core 1216. The processor with at least one first ISA instruction set core 1216 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1204 represents a compiler that is operable to generate first ISA binary code 1206 (e.g., object code) that can, with or without additional linkage processing, be executed on the processor with at least one first ISA instruction set core 1216.

Similarly, FIG. 12 shows the program in the high level language 1202 may be compiled using an alternative instruction set compiler 1208 to generate alternative instruction set binary code 1210 that may be natively executed by a processor without a first ISA instruction set core 1214. The instruction converter 1212 is used to convert the first ISA binary code 1206 into code that may be natively executed by the processor without a first ISA instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have a first ISA instruction set processor or core to execute the first ISA binary code 1206.

In different embodiments, a device may service or otherwise support multiple clients. However, the scalability of a device may be limited by its capability to maintain information about each of the different clients that it is servicing, which in turn may be limited by the silicon die area or other space available to store such information. For example, a single-root input/output virtualization (SR-IOV) device, as defined by the Peripheral Component Interconnect Express (PCIe) specification, can implement a larger number of virtual functions (VFs) to support a larger number of clients. A device can also implement a larger number of queues and associated client-specific state to support a larger number of clients.

FIG. 13 illustrates one embodiment of a scalable device 1300 which may be implemented in logic gates, storage elements, and/or any other type of circuitry, all or parts of which may be included in a discrete component and/or integrated into the circuitry of a processing device or any other apparatus in a computer or other information processing system. For example, device 1300 in FIG. 13 may correspond to coprocessor 138 in FIG. 1 or special purpose logic 208 in FIG. 2.

A scalable device according to one embodiment may use any number of work queues 1350, where a work queue is a data structure to be used to accept work from clients. A work queue may be a dedicated work queue (DWQ) that may accept work from a single client or a shared work queue (SWQ) that may accept work from multiple clients. For example, device 1300 is shown as including DWQs 1310 and 1314 and SWQ 1312, which may accept work from clients 1320, 1322, 1324, 1326, and 1328.

A work queue may be implemented using memory within the device (e.g., device 1300) and/or using memory not within the device (e.g., host memory, system memory, registers or other storage locations not within the device). Using host memory, for example, a work queue 1350 may be implemented with a base register, a head register, and a tail register that are writable by software to inform the device about work submission. Using device memory, for example, a work queue 1350 may be implemented with an address to which software may write to submit work.

Work queues 1350 may be used to store work descriptors that include a client identifier (ID) and privileges. The client ID is to identify the client (e.g., with a process address space identifier (PASID)) and the privileges indicate the privileges that the device may use to identify the address domain and privileges of the client. Work descriptors may be populated by trusted hardware (e.g., a CPU in a secured environment) and/or trusted software (an operating system (OS) running on a CPU in a secured environment) to ensure that they cannot be spoofed by unprivileged clients.

In various implementations, work descriptors are fully self-describing so that the device does not need to retain any client-specific state, and thus does not require additional memory to support additional clients. A fully self-describing work descriptor contains all the information needed to perform the work requested.

For example, a work descriptor in an embodiment may include a pointer to a completion record in host memory where completion status (including any error status) is to be written. A completion record may also contain any partial results that a subsequent work descriptor may use, so that data may be carried forward through operations (e.g., a cyclic redundancy check computation may use the result from each step as an input to the next step). A completion record may also contain flag bits and/or any other information that may be used in performing operations. Therefore, no memory within the device will be used to store per-client state regarding completion status, partial results, flag bits, etc.

In various implementations, work descriptors may also be used to avoid other limits on the scalability of the device. For example, limiting the number of clients to one per messaged-signaled interrupt in a PCI MSI-X table in the device may be avoided according to either of the following approaches. According to either approach, any client may be set up with multiple interrupts so that the client can choose to specify different interrupts for different descriptors, thus allowing the client to perform interrupt rebalancing without involving OS or other system software.

In an embodiment, a work descriptor may be designed to include interrupt message information (e.g., MSI address and data) passed in by the client. Since the interrupt message is provided by the client, it is untrusted, so interrupt remapping hardware (e.g., an I/O memory management unit) may be responsible for ensuring that a client cannot request an interrupt that is not assigned to it. For example, a PASID along with a remappable interrupt message may be used to locate an Interrupt Remapping Table Entry for the interrupt message (PASID granular interrupt remapping). PASID granular interrupt remapping allows the same message to have different meanings when used in conjunction with different PASIDs, and it also allows system software to control which interrupt messages may be used by each client (as identified by the client's PASID). Then, the device can use the interrupt message information from the work descriptor to generate the interrupt when it is done with the operation, while avoiding storing interrupt messages in the device.

In an embodiment, a work descriptor may be designed to include an interrupt handle (instead of the full MSI address and data values). The interrupt handle in the descriptor designates an entry in an interrupt message table. The device may implement the interrupt message table in host memory, with each interrupt table entry containing the MSI address and data. Since the interrupt message table is in host memory rather than device memory, it can be made large enough to support any number of clients. The interrupt handle in the work descriptor may be used by the device to index into the interrupt table to identify the MSI address and data values for generating the interrupt when the device is done with the operation. The device will first validate the interrupt handle using the PASID to ensure the client is allowed to use the specific interrupt handle. The device may validate the interrupt handle by using PASID granular interrupt message tables or by including the PASID in the interrupt table entry during interrupt setup and generation, matching the entry's PASID against client's PASID. To avoid reading interrupt table entries from host memory on every descriptor, an interrupt message cache within the device may cache frequently used interrupt entries.

In addition to reducing or eliminating per-client state on the device, certain embodiments provide for efficiently processing work from many clients. Embodiments may allow prioritization of work from time-sensitive clients while ensuring forward-progress on work from other clients. Embodiments may prevent errors or performance issues due to some clients from negatively affecting other clients.

A work submission portal is a means by which clients may submit work requests to a device. In an embodiment, an SWQ may have more than one work submission portal to which clients may submit work, rather than a single work submission portal mapped to all clients using the SWQ. The use of a single work submission portal per SWQ may cause clients to keep retrying work submissions because they experience the SWQ as full, which may make the use of the device difficult and unpredictable for other clients. In contrast, the use of multiple work submission queues per SWQ according to certain embodiments may provide for prioritization of work requests and prevention of starvation of some clients. In embodiments, work submission portals may be implemented as memory mapped I/O (MMIO) addresses to which clients may write to submit work requests, so multiple work submission portals may be provided by assigning more than one MMIO address to an SWQ and providing different MMIO addresses to different clients, which does not require additional logic circuitry or storage in the device.

In various embodiments, different work submission portals for an SWQ may have different characteristics, such as different work acceptance priorities for different clients. For example, an SWQ may have a first submission portal designated as a limited portal and a second submission portal designated as an unlimited portal. The SWQ may have a configurable threshold that may be used to reserve some entries exclusively for work submitted through the unlimited portal. For example, the SWQ may be configured to use only up to 80% (threshold) of the SWQ space for work submitted through the limited portal, while work submitted through the unlimited portal may use 100% of the SWQ space. Then, privileged software (e.g., the device driver) can map the limited portal to user space clients and keep the unlimited portal for itself. If user space clients experience an SWQ full condition (e.g., the SWQ returns 'Retry' to user space clients when the SWQ is 80% full), instead of continuously retrying work submission themselves, they can make a request to the device driver to submit the work descriptor on their behalf. The device driver can serialize requests from user space clients and use the unlimited portal to submit work requests. Since 20% of the SWQ space is reserved for the unlimited portal, the device driver's work submission will likely succeed.

Embodiments may also provide for handling situations in which the SWQ is 100% full (e.g., even the unlimited portal returns 'Retry'). In an embodiment, the device driver may respond to the client with 'Retry' as if 'Retry' had been received directly from the device. In an embodiment, the device driver may block the client until the work can be submitted, and the device driver may possibly schedule another client in the meantime. In an embodiment, the device driver may place the work descriptor in a software-defined work queue until it can be submitted to the device, but resume the client as if the work had been successfully submitted to the device. According to this latter approach, the client may continue operation while waiting for the device to catch up. Embodiments may provide for the use of this latter approach, by ensuring that all descriptors to the device are independent of each other with respect to ordering or by preventing the client from submitting any descriptors directly to the device that could be processed prior to the descriptor that was queued in software by the device driver. This prevention may be achieved by removing the device submission portal from the client's memory map so the client cannot submit work to the device directly or by locking the SWQ so that no clients can submit work. In this locking approach, all clients work submissions would return 'Retry' and clients would have to request the device driver to submit their work, which would provide fairness, but may also have high overhead because of the bottleneck of work submissions going through the device driver (which might be acceptable because it would only happen when the shared work queue is completely full).

Embodiments may also provide for configurability of the work queues themselves. For example, any or each of the multiple work queues may be configured, at run-time based on client requirements, as dedicated or shared. Work queues may be assigned different priorities and configured by software. The device may dispatch commands from higher priority work queues preferentially over commands from lower priority work queues without starving the lower priority work queues. Some clients may have access to multiple work queues, and thus have the ability to prioritize their own work, while other clients may have access to only a single work queue, thus fixing the priority of all work they submit.

Embodiments may also provide for alleviating a problem which occurs when a device is blocked because it is waiting for a response from another part of the system (e.g., completion of a memory read, translation of address, handling of page fault) while performing an operation. This problem is called head-of-line blocking, because the operation being performed in the device prevents other operations in line behind it from making progress.

In various embodiments, to alleviate head-of-line blocking, a device may include multiple operation components (engines) that can process individual work descriptors in parallel, such as engines 1330, 1332, 1334, and 1336. In an embodiment, one or more work queues may be grouped together with one or more engines. A device may support several groups, such as groups 1340 and 1342. Each work queue and each engine may be configured by software to be part of any one group. Work descriptors from one or more work queues in a group may be dispatched to any of the engines in that group. Thus, if one engine in a group is waiting for an external response while processing a descriptor from a work queue, other engines in the group may continue to process other work descriptors from the same or other work queues.

In an alternative embodiment, a device may implement an out-of-order processing engine, which may suspend a work descriptor that is waiting for an external response, and process other work descriptors in the meantime from the same or other work queues.

Furthermore, in various embodiments, a device may have internal resources (e.g., device internal memory) that engines use to process work descriptors from various clients. If these resources are limited, the device may prioritize (or provide QoS for) use of these resources by different clients to ensure that work descriptors (e.g., relatively large or time-consuming ones) from one or a few clients do not consume most or all internal resources, thereby affecting the processing of other clients and overall performance of the device. The prioritization may be done using a credit-based system in which credits represent the internal resources. Credits may be assigned to groups, individual work queues, or individual engines to control the number of resources each group, work queue, or engine is allowed to use to process its work descriptors. In an embodiment, a device may define two credit thresholds for each group, work queue, or engine: a first threshold to specify a minimum number of credits reserved for a group, work queue, or engine (minimum guaranteed or reserved credits), and a second threshold to specify a maximum number of credits allowed for a group, work queue, or engine (maximum allowed credits).

Embodiments may also provide for efficient handling of page faults. If a device supports virtual memory (e.g., shared virtual memory (SVM) or I/O virtual addresses (IOVA)), the addresses given to the device in work descriptors are not guaranteed to be mapped in physical memory. Before accessing host memory (e.g., through direct memory access (DMA)), the device may request address translation from an I/O memory management unit (IOMMU), using, for example, the Address Translation Services described in the PCIe specification. The IOMMU walks the address translation tables and, if a translation is present, returns the translated physical address to the device so that the device can access the data in memory. However, if the virtual address is not currently present in main memory, the result will be a translation error (an I/O page fault). A page fault may also occur when a page is present, but the processor or device does not have rights to perform the type of access requested (e.g., a device attempts to write to a read-only page).

When a device encounters a page fault, it cannot handle the page fault itself because the memory management system software does not run on the device. Therefore, according to a method (1400) illustrated in FIG. 14, after the application submits a command to the device (1410), the device attempts to access the page (1420), and the IOMMU responds with a page fault (1430), the device sends a page fault notification through the IOMMU to the OS (1440) and blocks the descriptor processing until the page fault is resolved. After resolving the page fault (1450), the OS responds back to the device, through the IOMMU, that the page is available (1460). Then, the device attempts to re-access the page, and this time the access is successful (1470).

A device typically implements a limited number of simultaneous outstanding I/O page fault notifications to the OS. Hence, when supporting a large number of clients, the device may encounter many page faults and may usually be waiting for at least one page fault to be resolved, which will significantly reduce the performance of the device.

Therefore, instead of blocking on an I/O page fault, some implementations, such as method 1500 in FIG. 15, may include (after the application submits a command to the device (1510), the device attempts to access the page (1520), and the IOMMU responds with a page fault (1530)), the device directly notifying the client about a page fault (1540) and terminate processing of the work descriptor that caused the page fault. Then, the device may continue processing other work descriptors without blocking while the application may resolve or otherwise respond to (as described below) the page fault (1550). After the page fault is resolved, the application may resubmit the command to the device (1560) and the device may attempt to re-access the page (1570).

According to embodiments such as method 1500, page fault handing may be left to the client. For example, the client application may request the OS to resolve the page fault (e.g., by accessing the faulting pages) and resubmit a work descriptor to resume the work after the page fault is resolved. Alternatively, the client may decide to complete the remaining work using some other method instead of using the device, such as by using the CPU to perform the operation.

The mechanism used by the device to notify the application that it has encountered a page fault is called partial completion. In embodiments including partial completion, the device may report completion of the operation to the client in the normal way (e.g., by setting a device register, modifying the tail pointer of a queue or ring buffer, writing to a shared memory location, generating an interrupt, or any combination of these), but the completion record information may include the following additional elements: a status field indicating that a page fault was encountered, an indication of how much of the operation completed prior to the page fault, the virtual address that could not be translated, an indication of whether the device intended to read or write to the address that could not be translated, and any other information needed by software to resume the operation (see examples below).

As implied by the name, partial completion means that the device may have performed part of the requested operation prior to encountering the page fault. By reporting partial completion to the client, the client (e.g., application software) may begin using the results that have been completed, even while the page fault is being resolved and the remainder of the operation is being performed by the device.

In embodiments, a partial completion may report that none of the operation has been completed, if, for example, the device encounters a page fault on the first page that is needed to begin the operation.

In embodiments, depending on the type, length, and complexity of the operation, the device may restart the operation from the beginning rather than resume from the point where it encountered the page fault. In this case, the device may report that none of the operation has completed, even when the page fault was not on the first page (assuming that the partially completed operation has not overwritten any of its inputs).

In embodiments, the partial completion information includes all information required to resume the operation. The client may resume the operation by submitting a new command that starts where the previous operation stopped. For operations that carry forward data throughout the operation (e.g., CRC computation), if a page fault is encountered part-way through the operation, the intermediate result is retained for use when the operation is resumed. The intermediate result may be saved in the completion record along with the page fault information. When the application resumes the operation after satisfying the page fault, it passes the intermediate result along with the command to resume the operation.

Apparatus and Method for Dynamically Adjusting Pipeline Depth to Improve Execution Latency As described above, software running on CPU cores offload jobs, via descriptors, to specialized accelerators that may be better at performing those particular jobs. Accelerators typically include execution units, sometimes referred to herein as Engines, that are responsible for doing the execution work associated with the descriptors. As part of this execution, the Engines typically have to deal with significant system latency, for example, for address translation or for data reads from memory. If the amount of work associated with each descriptor is relatively large, say 2 MB, then even executing a single descriptor at a time will allow the Engine to achieve relatively high performance. However, if the work associated with each descriptor is relatively small, say 512B, then working on a single descriptor at a time will not allow high performance targets to be achieved. To address this issue, an Engine may be deeply pipelined, allowing the Engine to work on multiple descriptors at a time and hiding system latencies associated with each descriptor.

However, the deep pipelining does not provide benefits for larger descriptors sizes. In fact, the deeper pipelining actually works against the device on the key performance metric of job execution latency. This is because with deeper pipelining, there can be a large number of descriptors sitting inside the Engine waiting to be executed. When descriptors sizes are large, each descriptor has a large service time associated with them, meaning that for a newly submitted descriptor, the waiting time before being able to be executed becomes very high.

The embodiments described above operate at the Work Queue (WQ) level of dispatch priority. These embodiments can ensure forward progress by kernel threads while application threads are blocked, allowing WQs to have different levels of priority in dispatching jobs to Engines, limiting the amount of work associated with each descriptor, and reducing the size of a WQ to limit how many jobs are queued on device ready to be dispatched to Engines. These embodiments also support grouping of WQs and Engines, allowing certain WQs to only be able to dispatch work to certain Engines, ensuring that a particular Group is not impacted as much by behavior in a different Group.

One embodiment of a descriptor execution engine is configured with reduced pipelining so that when a descriptor is accepted, it cannot have as many descriptors ahead of it, thereby ensuring lower latency. In one implementation, higher IOPS (I/O operations per second) can be sacrificed in favor of lower latency in cases where low latency is more important than high IOPS. Instead of queueing up new jobs, the accelerator can "fail fast" with a retry response to indicate that it cannot execute the job in accordance with the latency requirements.

FIG. 16 illustrates an example in which a plurality of applications or virtual machines 1610A-D offload work to an accelerator 1600 by submitting descriptors to a shared work queue 1601. In this example, the combination of a deep engine pipeline 1602 and large descriptor sizes can result in longer latency due to higher waiting time before starting to execute. In particular, while the deep engine pipeline 1602 can achieve high IOPS, which is important for small descriptor sizes such as 4 KB or smaller jobs, it may queue up a large number of descriptors ahead of a new descriptor, meaning a high waiting latency for any new descriptor, especially when the queued up descriptors are large (e.g. 2 MB).

In this implementation, when a VM 1610A-D submits a new descriptor to the work queue 1601 is it unclear whether the new descriptor will be processed with low latency (e.g., with a few large descriptors ahead of it inside the engine pipeline 1602) or with high latency (e.g., with many large descriptors ahead of it inside the engine pipeline 1602). With new accelerator offload frameworks such as synchronous offload and hardware-accelerated microservices becoming more important, a solution is needed to ensure that latency requirements are met.

Certain software architectures such as SR-IOV (Single Root I/O Virtualization) based architectures, have an intermediate driver that submits jobs on behalf of other VMs/applications. Because this driver has an understanding of all outstanding jobs to the accelerator work queue and engine pipeline, it can self-throttle to avoid overloading the accelerator with too many descriptors to avoid high descriptor execution latency. If the accelerator load is too high, it can provide backpressure to any application requesting a new descriptor through software mechanisms.

In FIG. 17, for example, driver 1750 can self-throttle and manage outstanding jobs offloaded to the accelerator 1600, ensuring that the accelerator 1600 does not get overloaded and exhibit intolerably high latency. In particular, the driver 1750 can back-pressure job-submitting applications or VMs 1710A-D to meet latency requirements.

In certain implementations, however, no intermediary software driver is used. For example, using PASIDs (Process Address Space IDs) and SIOV (Scalable I/O Virtualization), job submitters such as VMs 1710A-D are provided with direct access to hardware accelerators 1600. In one embodiment, the ENQCMD/S (enqueue command) instruction is used for job submission with PASIDs. A built-in hardware retry response is generated in response to the ENQCMD/S instruction if the accelerator is too full. In one implementation, this hardware retry is used as the backpressure signal in place of software-driven backpressure signals to ensure reduced device loading and job execution latency.

Embodiments of the invention include hardware which is dynamically configurable by software to restrict engine depth artificially, thereby sacrificing additional pipelining and processing resources which can be detrimental for latency-sensitive workloads.

FIG. 18 illustrates an implementation in which latency and/or throughout requirements 1850 for workloads of one or more virtual machines 1810A-D are communicated to engine configuration circuitry 1860 of the accelerator 1800. While workloads of VMs 1810A-D are used as an example, the underlying principles described here may be implemented for any type of software including non-virtualized applications and operating systems. Regardless of the type of software executed on the platform, the engine configuration circuitry 1860 dynamically configures the depth of the accelerator engine pipeline 1802 and work queue 1801 based on the specified latency/throughput requirements 1850. The engine configuration circuitry 1860 may also configure various other accelerator resources based on the processing requirements 1850 and the type of accelerator 1800 (e.g., updating execution unit performance or power states, memory interface throughput, graphics processing performance or power states, etc).

Thus, workloads with latency requirements may specify these requirements to the engine configuration circuitry 1860, which responsively configures a shallower depth of the engine pipeline 1802 and/or work queue 1801. These components will then reach a "full" state earlier when all work queue 1801 and engine pipeline 1802 slots are filled with descriptors. Once all entries are filled, the accelerator 1800 will return a retry indication 1870 for a newly submitted descriptor, resulting in a "fail fast" methodology that communicates to the software that the accelerator 1800 is currently incapable of servicing the new descriptor with sufficient latency. For latency-sensitive workloads, providing this feedback immediately allows the software to pursue other options, rather than running it on the accelerator 1800 with an intolerably high latency.

In various embodiments, the engine pipeline depth can be tuned deeper for smaller descriptors and shallower for larger descriptors to achieve different levels of pipelining appropriate for the expected sizes of descriptors and latency requirements. The engine configuration hardware 1860 illustrated in FIG. 18 specifically configures a shallow engine pipeline 1802 to provide lower latency behavior for large descriptors (e.g., 2 MB in size).

In contrast, FIG. 19 illustrates a configuration for workloads where latency is not as important as IO operations per second (IOPS) for small descriptors (e.g., 512B descriptors). In this case, software can still choose to make use of the full pipelining resources available on the accelerator 1900, as indicated by the extended engine pipeline 1902 and work queue 1901. The latency and/or throughput requirements 1950 indicate a high throughput requirement and a higher latency threshold to the engine configuration circuitry 1860, which configures the engine pipeline 1902 and work queue 1901 accordingly. Software can thus explicitly leave deep pipelining in place to support higher IOPS for small descriptors (as in FIG. 19), or it can reduce engine pipeline depth to avoid long waiting times for latency-sensitive workloads (as in FIG. 18).

In some implementations, the pipeline depth controls described herein are made available to software on a per-group and/or per-engine basis on an accelerator. Thus, it is possible for some groups and engines to support low latency performance, explicitly sacrificing pipelining resources in the hardware, while other groups and engines can support high IOPS by making more use of the pipelining resources available on the hardware.

FIG. 20 illustrates an implementation in which a first group of VMs 1910A-D with IOPS-focused workloads and a second group of VMs 1911A-D with latency-focused workloads share the same accelerator 2000. The VMs 1910A-D, 1911A-D and associated work requests may be grouped based on latency/throughput requirements 2050-2051. Once grouped, the first and second groups of VMs communicate group-level workload processing requirements 2050 and 2051, respectively, to the engine configuration circuitry 2060 of the accelerator 2000. In response, the engine configuration circuitry 2060 configures a first work queue 20011 and engine pipeline 20021 to process the IOPS-focused workloads of the first group of VMs 1910A-D and configures a second work queue 2001L and engine pipeline 2002L to process the latency-focused workloads of the second group of VMs 2011A-D.

For example, the engine configuration circuitry 2060 may configure separate slices of the accelerator 2000 to process the different types of workloads. For example, the engine configuration circuitry 2060 may provide the full pipelining resources of the accelerator 2000, including the extended engine pipeline 20021 and work queue 20011, to process the IOPS-focused workloads for which IO operation throughput is more important than latency. At the same time, the engine configuration circuitry 2060 may provide reduced pipelining resources in the form of a shallow engine pipeline 2002L and work queue 2001L to process the latency-focused workloads of the second group of VMs 1911A-D.

In one embodiment, a scheduler (not shown) or other supervisory program (e.g., a VMM, OS, etc) evaluates the latency/throughput requirements 2050-2051 of the various VMs 1910A-D, 1911A-D to form the two VM groups with different execution characteristics. The scheduler then indicates the latency/throughput requirements of the two groups to the engine configuration hardware 2060, which responsively configures the work queues 20011, 2001L and engine pipelines 20021, 2002L as described above. In this manner, software can tailor hardware topology to match the expected workload and provide IOPS-focused and/or latency-focused hardware performance. In addition, software can configure the hardware to provide performance characteristics tuned to expected workloads in different slices of an accelerator.

In the embodiments of the invention described herein, the engine configuration hardware 2060 is supplied latency and/or throughput requirements, and dynamically utilizes available pipelining and other hardware resources of the accelerator based on its evaluation of these requirements. For example, the engine configuration hardware 2060 can use more pipelining automatically when smaller descriptors are submitted, and automatically use less pipelining when larger descriptors are submitted. Moreover, the engine configuration hardware 2060 can partition the accelerator 2000 into slices and configure the engine pipelines in each slice based on latency requirements of the descriptors to be processed by that slice.

FIG. 21 illustrates a method in accordance with embodiments of the invention. The method may be implemented on the architectures described herein, but is not limited to any particular system or processor architecture.

At 2100, groups of software entities (e.g., VMs, applications) are formed based on the workload processing requirements of the software entities. As described above, for example, the workload processing requirements may include latency thresholds and/or throughput thresholds.

At 2101, workload processing requirements are specified to the accelerator. For example, a scheduler or other supervisory program may provide the workload processing requirements to configuration hardware of the accelerator (e.g., by setting values in registers of the accelerator configuration hardware).

At 2102, work queues and/or accelerator engine pipelines are configured for each group of software entities, in accordance with the workload processing requirements. For example, the configuration hardware may form accelerator slices—with each slice specifically configured to process one of the group of software entities based on the workload processing requirements. In the above example, the full pipelining resources of the accelerator 2000 are allocated to one slice to process IOPS-focused workloads for which IO operation throughput is more important than latency and a reduced set of pipelining resources are allocated to a second slice in the form of a shallow engine pipeline and work queue to process latency-focused workloads.

At 2103, work descriptors are submitted to the group-specific work queues. In some implementations, the work descriptors are submitted via the scheduler or other supervisory program.

At 2104, the accelerator engine pipelines read the work descriptors from the corresponding group-specific work queues and perform the processing operations specified by the work descriptors.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

EXAMPLES

The following are example implementations of different embodiments of the invention.

Example 1. An apparatus comprising: an interface to receive a plurality of work requests from a plurality of clients; and a plurality of engines to perform the plurality of work requests; wherein the work requests are to be dispatched to the plurality of engines from a plurality of work queues, the work queues to store a work descriptor per work request, each work descriptor to include information needed to perform a corresponding work request, wherein the plurality of work queues include a first work queue to store work descriptors associated with first latency characteristics and a second work queue to store work descriptors associated with second latency characteristics; engine configuration circuitry to configure a first engine to have a first pipeline depth based on the first latency characteristics and to configure a second engine to have a second pipeline depth based on the second latency characteristics.

Example 2. The apparatus of example 1 wherein the engine configuration circuitry is to determine the first and second latency characteristics based on data provided to the engine configuration circuitry by a client associated with the work requests.

Example 3. The apparatus of example 2 wherein the client associated with the work requests comprises an application, virtual machine, or supervisory application.

Example 4. The apparatus of example 1 wherein the first and second latency characteristics comprise latency requirements associated with the corresponding work requests.

Example 5. The apparatus of example 1 wherein the first and second latency characteristics comprise a maximum allowable latency value and/or a desired latency value.

Example 6. The apparatus of example 1 wherein the first latency characteristics comprise a first latency value and the second latency characteristics comprise a second latency value larger than the first latency value, then the engine configuration circuitry is to configure the second pipeline depth to be deeper than the first pipeline depth.

Example 7. The apparatus of example 1 wherein the engine configuration circuitry is to configure the first and second pipeline depths of the first engine and the second engine, respectively, based further on first and second throughput values associated with the corresponding work requests.

Example 8. The apparatus of example 7 wherein the first and second throughput values each comprise a minimum allowable throughput value and/or a desired throughput value.

Example 9. A method comprising: receiving, by a device, a plurality of work requests from a plurality of clients; performing the plurality of work requests on a plurality of engines; dispatching the work requests to the plurality of engines from a plurality of work queues, the work queues to store a work descriptor per work request, each work descriptor to include information needed to perform a corresponding work request, the plurality of work queues including a first work queue to store work descriptors associated with first latency characteristics and a second work queue to store work descriptors associated with second latency characteristics; and configuring, by engine configuration circuitry, a first engine to have a first pipeline depth based on the first latency characteristics and to configure a second engine to have a second pipeline depth based on the second latency characteristics.

Example 10. The method of example 9 wherein the engine configuration circuitry is to determine the first and second latency characteristics based on data provided to the engine configuration circuitry by a client associated with the work requests.

Example 11. The method of example 10 wherein the client associated with the work requests comprises an application, virtual machine, or supervisory application.

Example 12. The method of example 9 wherein the first and second latency characteristics comprise latency requirements associated with the corresponding work requests.

Example 13. The method of example 9 wherein the first and second latency characteristics comprise a maximum allowable latency value and/or a desired latency value.

Example 14. The method of example 9 wherein the first latency characteristics comprise a first latency value and the second latency characteristics comprise a second latency value larger than the first latency value, then the engine configuration circuitry is to configure the second pipeline depth to be deeper than the first pipeline depth.

Example 15. The method of example 9 wherein the engine configuration circuitry is to configure the first and second pipeline depths of the first engine and the second engine, respectively, based further on first and second throughput values associated with the corresponding work requests.

Example 16. The method of example 15 wherein the first and second throughput values each comprise a minimum allowable throughput value and/or a desired throughput value.

Example 17. A machine-readable medium having program code stored thereon which, when executed by a machine, causes the machine to perform the operations of: receiving, by a device, a plurality of work requests from a plurality of clients; performing the plurality of work requests on a plurality of engines; dispatching the work requests to the plurality of engines from a plurality of work queues, the work queues to store a work descriptor per work request, each work descriptor to include information needed to perform a corresponding work request, the plurality of work queues including a first work queue to store work descriptors associated with first latency characteristics and a second work queue to store work descriptors associated with second latency characteristics; configuring, by engine configuration circuitry, a first engine to have a first pipeline depth based on the first latency characteristics and to configure a second engine to have a second pipeline depth based on the second latency characteristics.

Example 18. The machine-readable medium of example 17 wherein the engine configuration circuitry is to determine the first and second latency characteristics based on data provided to the engine configuration circuitry by a client associated with the work requests.

Example 19. The machine-readable medium of example 18 wherein the client associated with the work requests comprises an application, virtual machine, or supervisory application.

Example 20. The machine-readable medium of example 17 wherein the first and second latency characteristics comprise latency requirements associated with the corresponding work requests.

Example 21. The machine-readable medium of example 17 wherein the first and second latency characteristics comprise a maximum allowable latency value and/or a desired latency value.

Example 22. The machine-readable medium of example 17 wherein the first latency characteristics comprise a first latency value and the second latency characteristics comprise a second latency value larger than the first latency value, then the engine configuration circuitry is to configure the second pipeline depth to be deeper than the first pipeline depth.

Example 23. The machine-readable medium of example 17 wherein the engine configuration circuitry is to configure the first and second pipeline depths of the first engine and the second engine, respectively, based further on first and second throughput values associated with the corresponding work requests.

Example 24. The machine-readable medium of example 23 wherein the first and second throughput values each comprise a minimum allowable throughput value and/or a desired throughput value.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An accelerator comprising:
an interface configured to receive work requests from a plurality of clients;
a plurality of engines configured to perform the work requests, wherein the work requests are to be dispatched to the plurality of engines from a plurality of work queues, the plurality of work queues to store a work descriptor per work request, each work descriptor corresponding to a work request and including an identifier of a client and one or more privileges of the client, and wherein the plurality of work queues include a first work queue to store work descriptors associated with work requests that share first latency characteristics and a second work queue to store work descriptors associated with work requests that share second latency characteristics; and engine configuration circuitry configured to cause a first engine to have a first pipeline with a first pipeline depth based on the first latency characteristics and to cause a second engine to have a second pipeline with a second pipeline depth based on the second latency characteristics, the first pipeline depth being longer than the second pipeline depth with more slots in the first pipeline for work descriptors based on the first latency characteristics including being less sensitive to latency than the second latency characteristics.

2. The accelerator of claim 1 wherein the first and second latency characteristics are obtained based on data received by the engine configuration circuitry from a client associated with the work requests.

3. The accelerator of claim 2 wherein the client associated with the work requests comprises an application, virtual machine, or supervisory application.

4. The accelerator of claim 1 wherein the first and second latency characteristics comprise latency requirements associated with the corresponding work requests.

5. The accelerator of claim 1 wherein the first and second latency characteristics comprise a maximum allowable latency value and/or a desired latency value.

6. The accelerator of claim 1 wherein the first latency characteristics comprise a first latency value and the second latency characteristics comprise a second latency value larger than the first latency value, then the engine configuration circuitry is to configure the second pipeline depth to be deeper than the first pipeline depth.

7. The accelerator of claim 1 wherein the engine configuration circuitry is to configure the first and second pipeline depths of the first engine and the second engine, respectively, based further on first and second throughput values associated with the corresponding work requests.

8. The accelerator of claim 7 wherein the first and second throughput values each comprise a minimum allowable throughput value and/or a desired throughput value.

9. A method comprising:

receiving, by an accelerator, work requests from a plurality of clients;

performing the work requests on a plurality of engines of the accelerator;

dispatching the work requests to the plurality of engines from a plurality of work queues, the plurality of work queues to store a work descriptor per work request, each work descriptor corresponding to a work request and including an identifier of a client and one or more privileges of the client, the plurality of work queues including a first work queue to store work descriptors associated with work requests that share first latency characteristics and a second work queue to store work descriptors associated with work requests that share second latency characteristics;

configuring, by engine configuration circuitry, a first engine to have a first pipeline with a first pipeline depth based on the first latency characteristics and a second engine to have a second pipeline with a second pipeline depth based on the second latency characteristics, the first pipeline depth being longer than the second pipeline depth with more slots in the first pipeline for work descriptors based on the first latency characteristics including being less sensitive to latency than the second latency characteristics; and processing work descriptors in the first work queue by the first engine in the first pipeline and processing work descriptors in the second work queue by the second engine in the second pipeline.

10. The method of claim 9 wherein the first and second latency characteristics are obtained based on data received by the engine configuration circuitry from a client associated with the work requests.

11. The method of claim 10 wherein the client associated with the work requests comprises an application, virtual machine, or supervisory application.

12. The method of claim 9 wherein the first and second latency characteristics comprise latency requirements associated with the corresponding work requests.

13. The method of claim 9 wherein the first and second latency characteristics comprise a maximum allowable latency value and/or a desired latency value.

14. The method of claim 9 wherein the first latency characteristics comprise a first latency value and the second latency characteristics comprise a second latency value larger than the first latency value, then the engine configuration circuitry is to configure the second pipeline depth to be deeper than the first pipeline depth.

15. The method of claim 9 wherein the engine configuration circuitry is to configure the first and second pipeline depths of the first engine and the second engine, respectively, based further on first and second throughput values associated with the corresponding work requests.

16. The method of claim 15 wherein the first and second throughput values each comprise a minimum allowable throughput value and/or a desired throughput value.

17. A non-transitory computer-readable medium having program code stored thereon which, when executed by a machine, causes the machine to perform:

receiving, by an accelerator, work requests from a plurality of clients;

performing the work requests on a plurality of engines of the accelerator;

dispatching the work requests to the plurality of engines from a plurality of work queues, the plurality of work queues to store a work descriptor per work request, each work descriptor corresponding to a work request and including an identifier of a client and one or more privileges of the client, the plurality of work queues including a first work queue to store work descriptors associated with work requests that share first latency characteristics and a second work queue to store work descriptors associated with work requests that share second latency characteristics;

configuring, by engine configuration circuitry, a first engine to have a first pipeline with a first pipeline depth based on the first latency characteristics and a second engine to have a second pipeline with a second pipeline depth based on the second latency characteristics, the first pipeline depth being longer than the second pipeline depth with more slots in the first pipeline for work descriptors based on the first latency characteristics including being less sensitive to latency than the second latency characteristics; and processing work descriptors in the first work queue by the first engine in the first pipeline and processing work descriptors in the second work queue by the second engine in the second pipeline.

18. The non-transitory computer-readable medium of claim 17 wherein the first and second latency characteristics are obtained based on data received by the engine configuration circuitry from a client associated with the work requests.

19. The non-transitory computer-readable medium of claim 18 wherein the client associated with the work requests comprises an application, virtual machine, or supervisory application.

20. The non-transitory computer-readable medium of claim 17 wherein the first and second latency characteristics comprise latency requirements associated with the corresponding work requests.

21. The non-transitory computer-readable medium of claim 17 wherein the first and second latency characteristics comprise a maximum allowable latency value and/or a desired latency value.

22. The non-transitory computer-readable medium of claim 17 wherein the first latency characteristics comprise a first latency value and the second latency characteristics comprise a second latency value larger than the first latency value, then the engine configuration circuitry is to configure the second pipeline depth to be deeper than the first pipeline depth.

23. The non-transitory computer-readable medium of claim 17 wherein the engine configuration circuitry is to configure the first and second pipeline depths of the first engine and the second engine, respectively, based further on first and second throughput values associated with the corresponding work requests.

24. The non-transitory computer-readable medium of claim 23 wherein the first and second throughput values each comprise a minimum allowable throughput value and/ or a desired throughput value.

\* \* \* \* \*